(12) United States Patent
Kwon et al.

(10) Patent No.: US 9,923,389 B2
(45) Date of Patent: Mar. 20, 2018

(54) ROBOT CLEANER

(71) Applicant: LG Electronics Inc., Seoul (KR)

(72) Inventors: Yunmi Kwon, Seoul (KR); Haemin Choi, Seoul (KR); Kanguk Kim, Seoul (KR); Hyoungrock Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 82 days.

(21) Appl. No.: 14/849,277

(22) Filed: Sep. 9, 2015

(65) Prior Publication Data

US 2015/0375395 A1    Dec. 31, 2015

(30) Foreign Application Priority Data

Apr. 16, 2015   (KR) .................. 10-2015-0053863

(51) Int. Cl.
*G06F 19/00* (2011.01)
*H02J 7/00* (2006.01)
*H02J 7/02* (2016.01)
*A47L 9/28* (2006.01)
(Continued)

(52) U.S. Cl.
CPC .......... *H02J 7/0013* (2013.01); *A47L 9/2857* (2013.01); *A47L 9/2873* (2013.01); *A47L 9/2894* (2013.01); *H02J 7/025* (2013.01); *H02J 50/10* (2016.02); *H02J 50/12* (2016.02); *A47L 2201/022* (2013.01); *Y10S 901/01* (2013.01); *Y10S 901/30* (2013.01)

(58) Field of Classification Search
CPC .... A47L 9/2857; A47L 9/2873; A47L 9/2894; A47L 2201/022; H02J 50/12; H02J 50/10; H02J 7/025; H02J 7/0013; Y10S 901/30; Y10S 901/01; B25J 9/16; B25J 9/1674; B25J 9/1697
See application file for complete search history.

(56) References Cited

U.S. PATENT DOCUMENTS

2005/0266891 A1* 12/2005 Mullen ............. H04M 1/72527
455/567
2010/0156347 A1   6/2010 Lee et al.
(Continued)

FOREIGN PATENT DOCUMENTS

DE    102010016263 A1   10/2011
EP         2637073 A2   12/2014
(Continued)

OTHER PUBLICATIONS

English translation for KR 101470364 B1.*

*Primary Examiner* — Rachid Bendidi
(74) *Attorney, Agent, or Firm* — Birch, Stewart, Kolasch & Birch, LLP

(57) ABSTRACT

A robot cleaner including a driving unit configured to move the robot cleaner; a charging unit disposed on an upper surface of the robot cleaner, and configured to wirelessly charge a mobile terminal; and a control unit configured to control the driving unit to move the robot cleaner to a position of the mobile terminal corresponding to a sensed preset signal, control the robot cleaner to execute a wireless charging of the mobile terminal placed on the charging unit according to a charging command, and output a feedback signal when the wireless charging of the mobile terminal is completed.

17 Claims, 14 Drawing Sheets

(51) Int. Cl.
    *H02J 50/10*    (2016.01)
    *H02J 50/12*    (2016.01)

(56)         References Cited

U.S. PATENT DOCUMENTS

2011/0093139 A1*   4/2011   Arms .................... H02J 17/00
                                                              701/2
2011/0241616 A1*  10/2011   Kim .................... H02J 7/025
                                                            320/108
2011/0286374 A1*  11/2011   Shin .................... H02J 7/025
                                                            370/311
2012/0214418 A1*   8/2012   Lee .................... G06F 1/3209
                                                            455/41.2
2013/0218395 A1*   8/2013   Kim .................... G05D 1/0246
                                                             701/23
2013/0300356 A1*  11/2013   Yang .................... H02J 7/0047
                                                            320/108

FOREIGN PATENT DOCUMENTS

KR          10-1470364  B1      12/2014
KR             101470364  B1 *  12/2014   ............. H02J 5/005

* cited by examiner

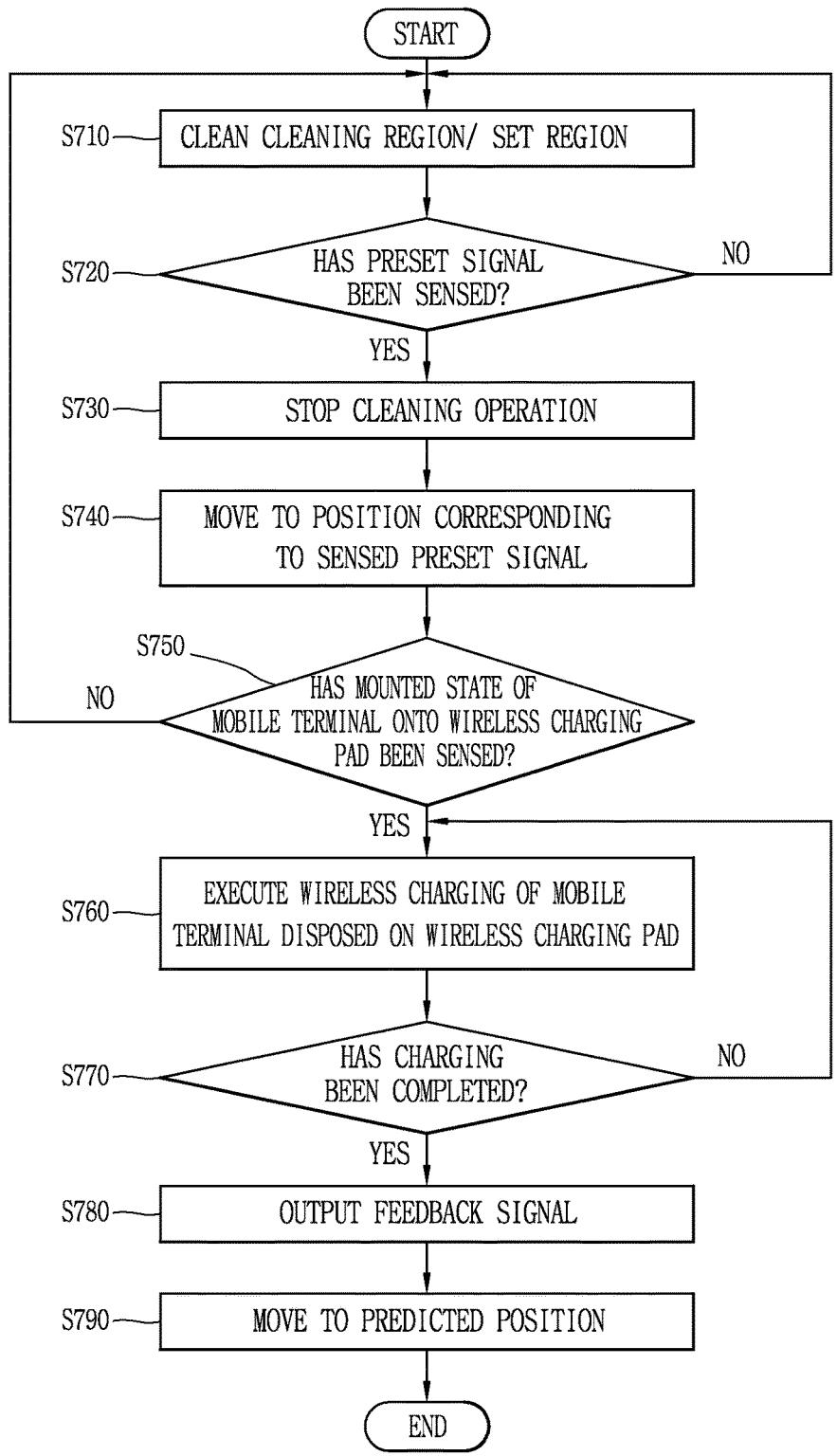

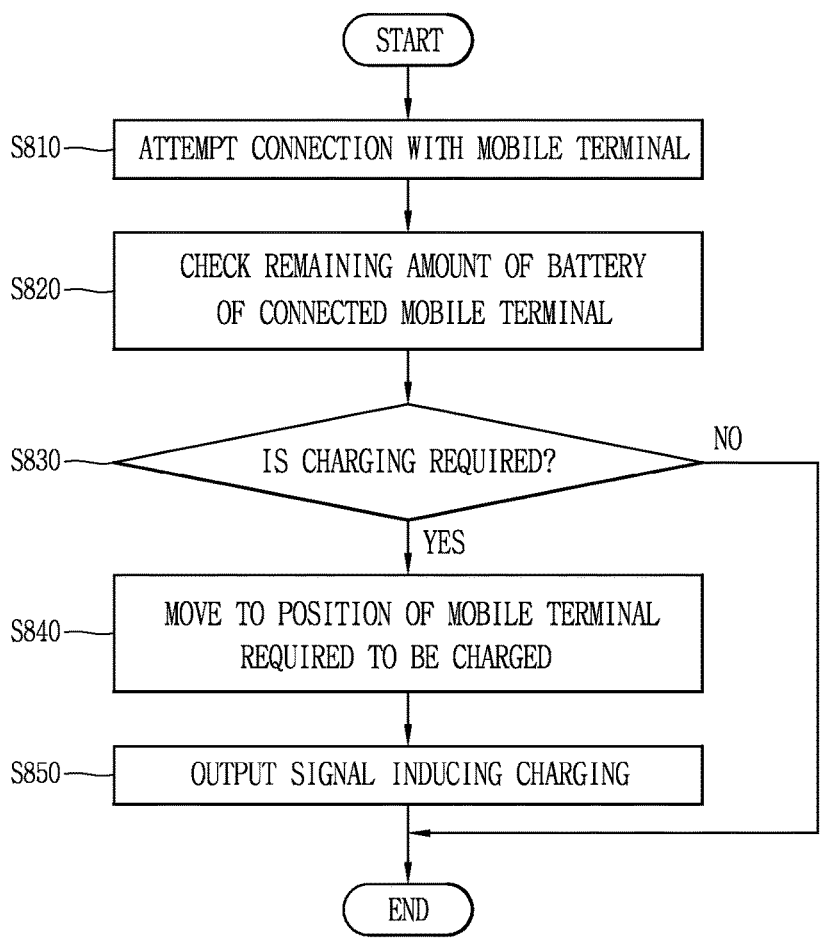

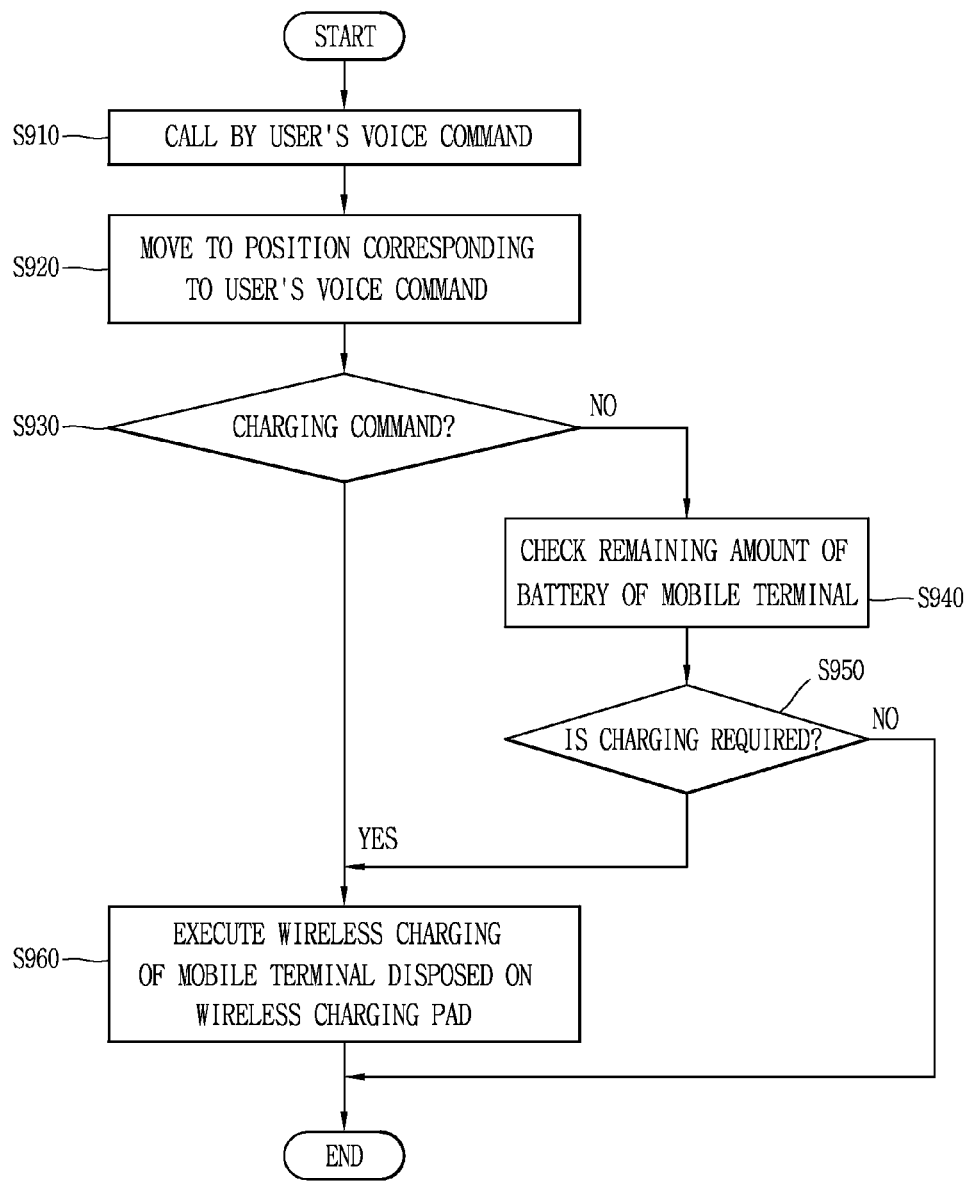

FIG. 10C
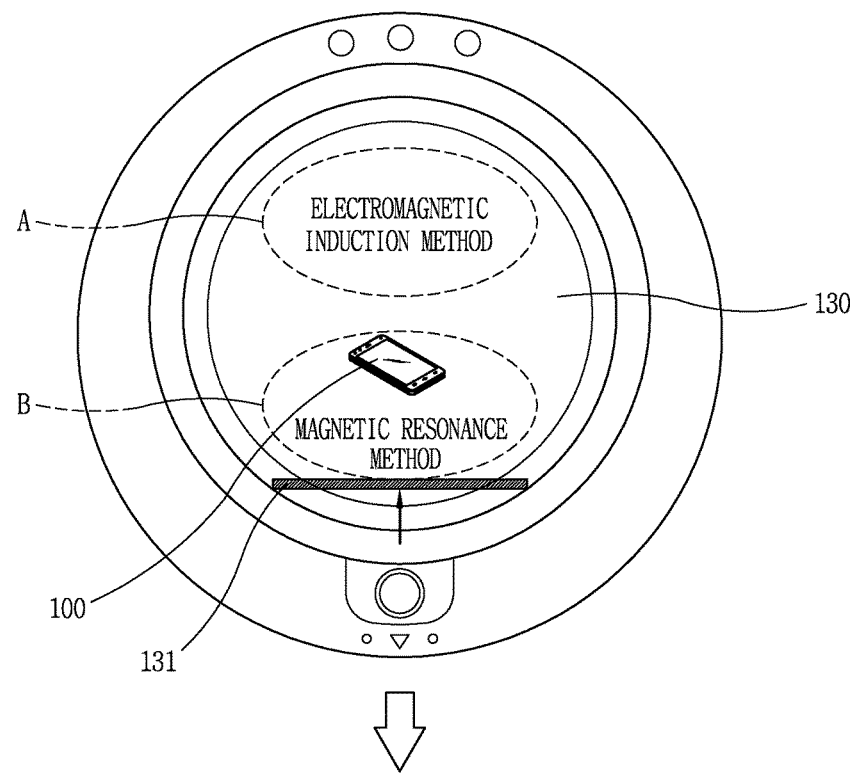
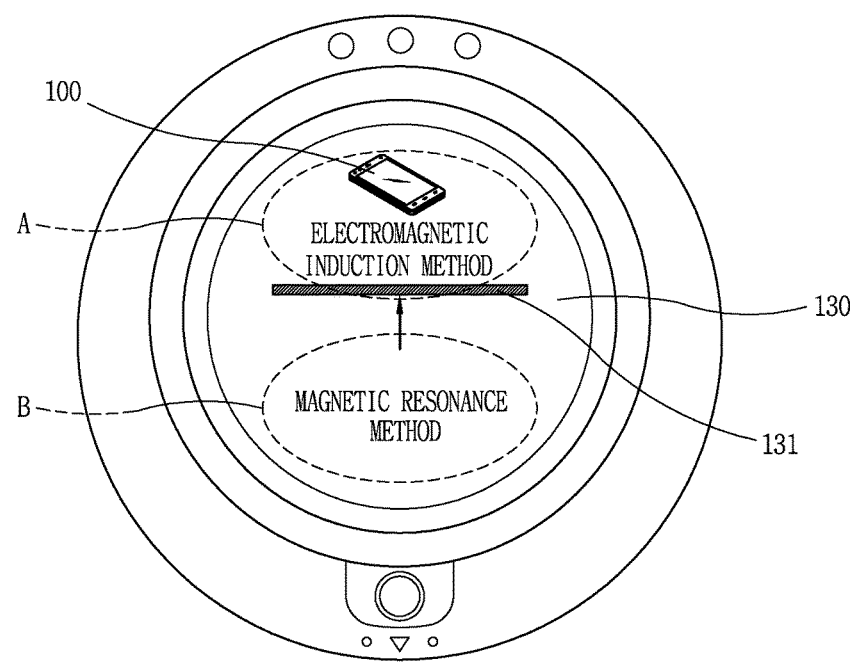

ROBOT CLEANER

CROSS-REFERENCE TO RELATED APPLICATION

Pursuant to 35 U.S.C. § 119(a), this application claims the benefit of earlier filing date and right of priority to Korean Application No. 10-2015-0053863, filed on Apr. 16, 2015, the contents of which is incorporated by reference herein in its entirety.

BACKGROUND OF THE INVENTION

1. Field of the Invention

The present invention relates to a robot cleaner, and more particularly, to a robot cleaner which can execute a wireless charging.

2. Background of the Invention

Generally, a robot has been developed for an industrial use, and has managed some parts of factory automation. As the robot is applied to various fields recently, home robots as well as medical robots, space robots are being developed. A representative of the home robot is a robot cleaner, a kind of home electronic appliance capable of performing a cleaning operation by sucking peripheral dust or foreign materials with autonomously moving on a predetermined region. The robot cleaner can execute various functions as well as a home cleaning function using such an autonomous movement. For instance, the robot cleaner can autonomously move to a charging station when power of a battery thereof is used up, thereby executing a charging operation.

A mobile terminal is also provided with a battery for portability. Such a battery can be charged by a wired charging method and a wireless charging method. Recently, a wireless recharge technology is commercially used. The wireless charging method largely includes an electromagnetic induction method using an electromagnetic induction phenomenon, and a magnetic resonance method for transmitting power to transmitting and receiving terminals with the same frequency. However, both of the methods have the following disadvantages. Firstly, an additional charging device is needed to charge a battery of a mobile terminal by a wireless charging method. Secondly, a user has to directly move to a position of the charging device, and place the mobile terminal on the charging device. This results in a user's inconvenience.

SUMMARY OF THE INVENTION

Therefore, an aspect of the detailed description is to provide a robot cleaner capable of charging a mobile terminal.

Another aspect of the detailed description is to provide a robot cleaner capable of efficiently performing a wireless charging by autonomously recognizing a mobile terminal required to charge a battery, and by moving to a position where the mobile terminal is located.

To achieve these and other advantages and in accordance with the purpose of this specification, as embodied and broadly described herein, there is provided a robot cleaner, including: a driving unit configured to move the robot cleaner; a charging unit disposed on an upper surface of the robot cleaner, and configured to wirelessly charge a mobile terminal; and a control unit configured to control the robot cleaner to move to a position corresponding to a sensed preset signal by operating the driving unit when the preset signal is sensed, and configured to control the robot cleaner to execute a wireless charging of the mobile terminal positioned on the charging unit according to a charging command, wherein when the wireless charging of the mobile terminal positioned on the charging unit is completed, the control unit outputs a feedback signal through an output unit.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings:

FIGS. 6 and 7 are flowcharts illustrating a method of charging a mobile terminal by a robot cleaner according to an embodiment of the present invention;

FIGS. 8 and 9 are flowcharts illustrating a method of recognizing a mobile terminal required to charge a battery, by a robot cleaner according to an embodiment of the present invention;

FIGS. 10A to 10C are views illustrating a method of adjusting a position corresponding to a wireless charging type of a mobile terminal, in a robot cleaner according to an embodiment of the present invention;

DETAILED DESCRIPTION OF THE INVENTION

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Although the terms first, second, etc. may be used herein to describe various elements, these elements should not be limited by these terms. These terms are generally only used to distinguish one element from another. When an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

The robot cleaner according to an embodiment of the present invention is provided with a charging pad configured to execute a wireless charging. When a preset signal (e.g., a user's voice calling the robot cleaner or a signal indicating that there exists a registered mobile terminal nearby) is sensed, the robot cleaner moves to a corresponding position to execute a wireless charging of the mobile terminal.

Figure 1:
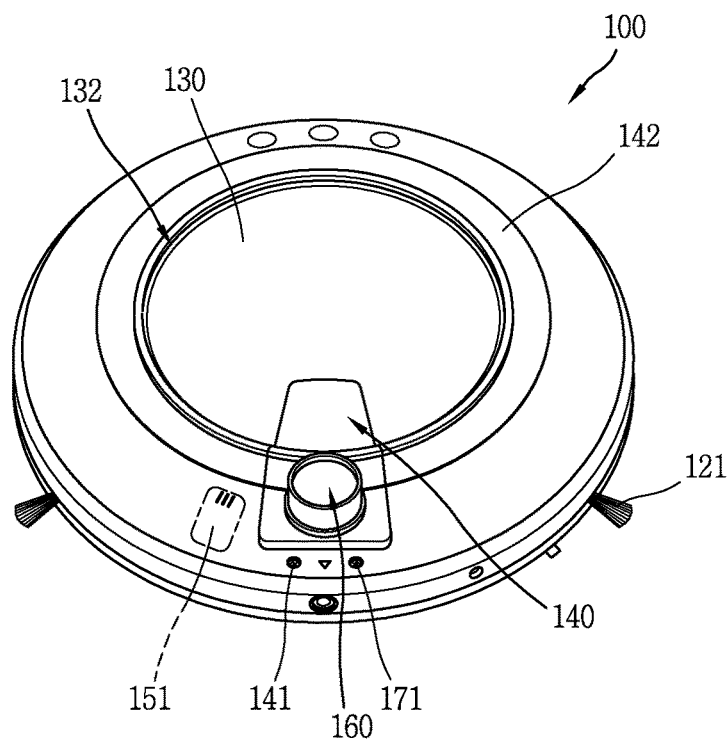
FIG. 1 is a perspective view of a robot cleaner according to an embodiment of the present invention.
Figure 2:
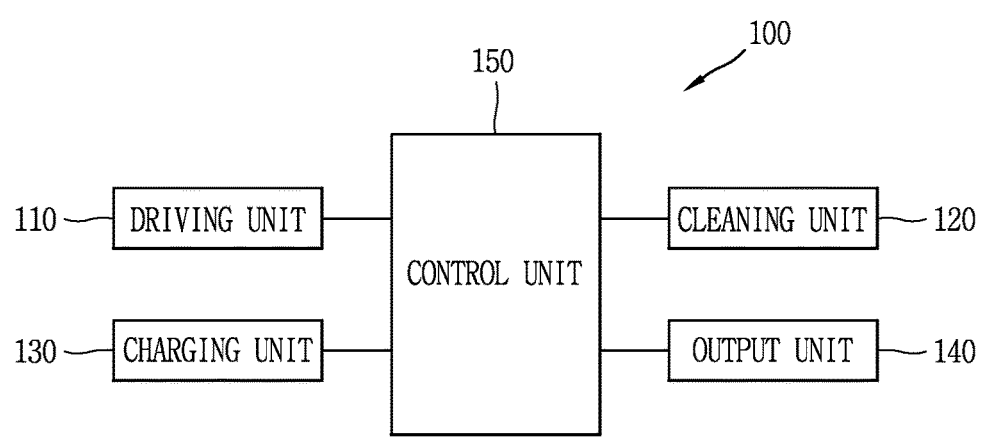
FIGS. 2 to 4 are block diagrams illustrating a robot cleaner according to an embodiment of the present invention.

Referring to FIGS. 1 and 2, the robot cleaner 100 according to an embodiment of the present invention includes a driving unit 110 configured to move the robot cleaner 100, a cleaning unit 120, a charging unit 130, an output unit 140, and a control unit 150. The driving unit 110 includes wheel motors for rotating wheels, and moves the robot cleaner 100 by driving the wheel motors. The wheel motors are connected to main wheels to rotate the main wheels, and are operated in an independent manner. Also, the wheel motors are rotatable in two directions. The robot cleaner is also provided with one or more supplementary wheels on a rear surface thereof, thereby supporting a body, minimizing friction between a lower surface of the body and a bottom surface (a surface to be cleaned), and smoothly moving the robot cleaner.

The cleaning unit 120 is configured to suck dust or foreign materials on a cleaning region or a set region, according to a cleaning command. The cleaning unit 120 includes a dust box for storing collected dust, a suction fan for providing a driving force to suck dust on a cleaning region, and a suction motor for sucking air by rotating the suction fan. The cleaning unit 120 is configured to suck peripheral dust or foreign materials. Referring to FIG. 1, the cleaning unit 120 further includes a rotation brush 121 rotatably positioned on a lower part of the body of the robot cleaner, and a side brush for cleaning a corner, etc. of a cleaning region such as a wall surface while being rotated centering around a rotation shaft of the body in a vertical direction. The rotation brush 121 makes dust on a floor, a carpet, etc. float in the air, while being rotated centering around a shaft of the body in right and left directions. A plurality of blades may be spirally provided on an outer circumferential surface of the rotation brush 121. A brush may be provided between the blades.

The robot cleaner 100 has its own cleaning function as well as the aforementioned moving function. The present invention provides the robot cleaner 100 capable of wirelessly charging a mobile terminal. For this, the charging unit 130 is provided on an upper surface of the body of the robot cleaner 100. The charging unit 130 is provided with a wireless charging pad for wirelessly charging a mobile terminal. The charging unit 130 may include a sensing unit for sensing whether or not a mobile terminal positioned on the wireless charging pad has contacted to the charging unit 130, and for sensing a contacted position. For instance, the sensing unit can be implemented as a pressure sensor, and be positioned on an upper surface of the wireless charging pad where a mobile terminal contacts.

The charging unit 130 is configured to charge a battery of a mobile terminal 200 (FIG. 5B) positioned on the wireless charging pad, by using at least one of an electromagnetic induction method using an electromagnetic induction phenomenon, and a magnetic resonance method for transmitting power to transmitting and receiving terminals with the same frequency. For instance, when charging the battery of the mobile terminal 200 by an electromagnetic induction method, the charging unit 130 includes a primary coil for generating an electromagnetic field by receiving power from the body, and a sensor for recognizing whether a mobile terminal has contacted the charging unit 130 and a contacted position. In this instance, the mobile terminal 200 positioned on the wireless charging pad includes a secondary coil for generating an induction current, a wireless charging power source, according to change of a magnetic field generated from the charging unit 130. The mobile terminal 200 can charge its battery using such an induction current.

Once the mobile terminal 200 is positioned on the wireless charging pad, the charging unit 130 can sense a contacted state of the mobile terminal 200 using at least one sensor, and check a position of the mobile terminal 200 within the charging unit 130. Upon sensing of the positioned state of the mobile terminal 200 onto the wireless charging pad, a controller 280 (FIG. 5B) can check a position of the mobile terminal 200, and determine whether the mobile terminal 200 can be wirelessly charged.

While the mobile terminal 200 is being wirelessly charged by the charging unit 130, the robot cleaner 100 can execute its own cleaning function as well as a moving function. A sliding preventing protrusion 132 is provided along an outer circumferential surface of the wireless charging pad. With such a configuration, even if the robot cleaner 100 moves or executes a cleaning operation while the mobile terminal is being charged by the charging unit 130, the mobile terminal 200 being charged does not fall off the robot cleaner 100.

The output unit 140 can output an operation state of the charging unit 130. More specifically, while the charging unit 130 executes a wireless charging of the mobile terminal 200 according to a charging command of the control unit 150, information indicating that the mobile terminal 200 is being charged can be output through the output unit 140 in the form of a voice, a message, an LED light, etc. When the mobile terminal 200 is completely charged by the charging unit 130, the output unit 140 can further output information indicating the completion of the charging.

The output unit 140 can display a charged state of the mobile terminal 200 disposed on the wireless charging pad. More specifically, the output unit 140 can display a remaining amount of the battery of the mobile terminal 200 being charged, in the form of a length of an LED light, or in the form of a text or an image on a screen. The output unit 140 can display, on the screen, a remaining amount of the battery of the robot cleaner 100, reservation information, and information related to a cleaning function (e.g., an intensive cleaning operation, a spatial extension, a cleaning type or a running type such as a zigzag driving, a cleaning operation on a preset region, etc.). The output unit 140 can be implemented as one of a light emitting diode (LED), a liquid crystal display (LCD) device, a plasma display panel, and an organic light emitting diode (OLED).

The control unit 150 controls an overall operation of the robot cleaner. The control unit 150 transmits a cleaning command with respect to a cleaning region or a set region, to the cleaning unit 120 by driving the driving unit 110. When a preset signal is sensed, the control unit 150 moves the robot cleaner 100 to a position corresponding to the sensed signal by driving the driving unit 110, and transmits a charging command to the charging unit 130 such that the mobile terminal positioned on the charging unit 130 is wirelessly charged. When a preset signal related to a wireless charging of the mobile terminal is sensed while the robot cleaner 100 cleans a cleaning region or a set region, the control unit 150 can firstly execute a charging command rather than a cleaning command.

Figure 3:
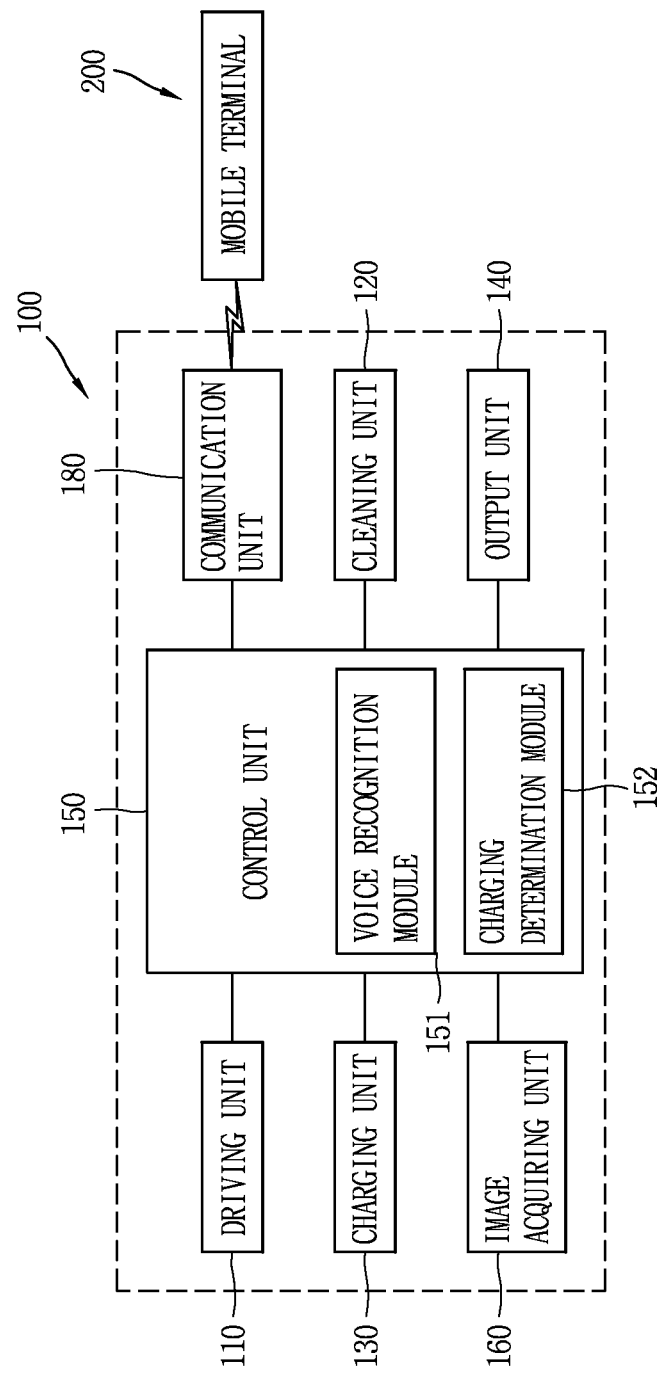
Figure 4:
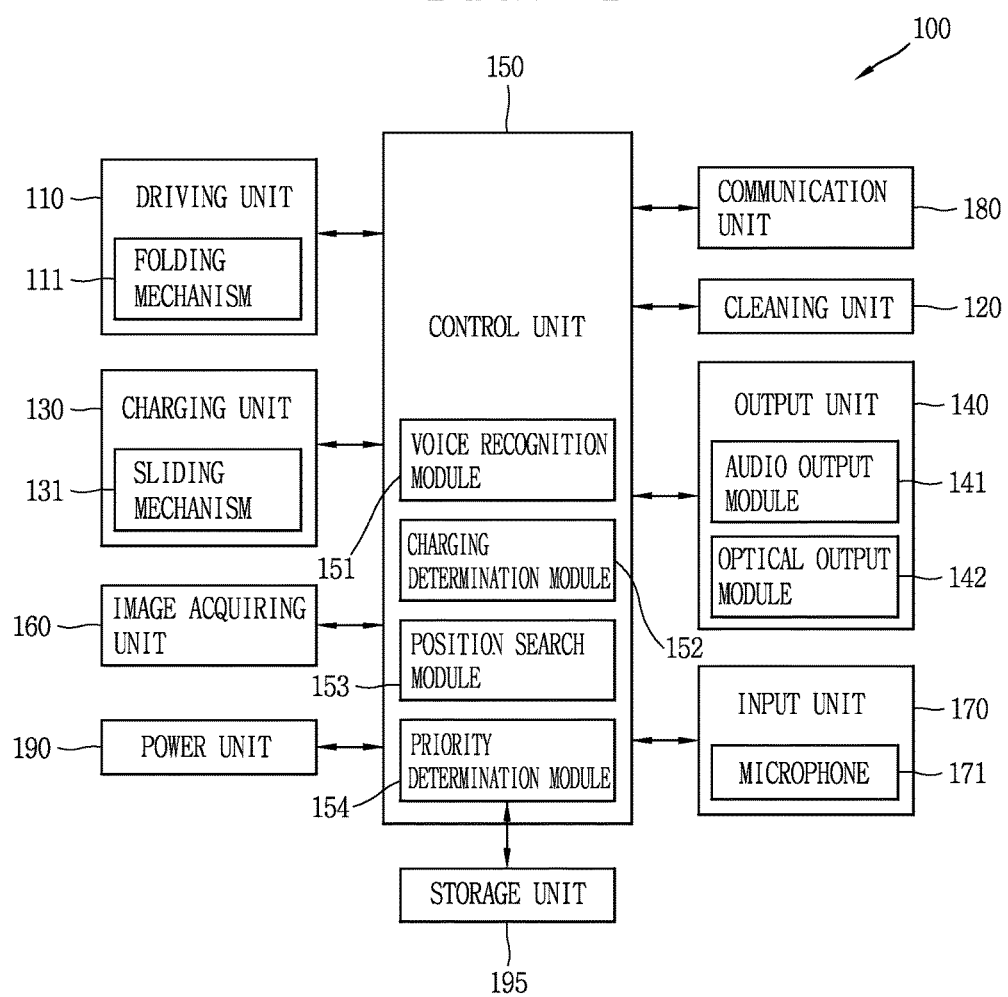

Next, FIGS. 3 and 4 are block diagrams illustrating the robot cleaner according to an embodiment of the present invention. The same components as the components shown in FIG. 2 will not be explained. As shown in FIG. 3, the robot cleaner 100 according to an embodiment of the present invention can further include a communication unit 180 configured to wirelessly communicate with at least one mobile terminal 200, and an image acquiring unit 160 having at least one camera. A voice recognition module 151 configured to recognize a user's voice, and a charging determination module 152 configured to determine whether the battery of the mobile terminal 200 should be charged or not, can be included in the control unit 150. Alternatively, the voice recognition module 151 and the charging determination module 152 can be separately provided.

The communication unit 180 can receive a signal from a peripheral terminal device, and transmit a response signal to the received signal or one or more data to the peripheral terminal device. If necessary, the communication unit 180 can ignore a signal received from an unauthorized terminal device or an unregistered terminal device. The communication unit 180 can communicate with at least one terminal device, using a short-range wireless communication method such as RF communication, Bluetooth, infrared ray communication (IrDA), wireless LAN and Zigbee.

The control unit 150 can control the robot cleaner 100 to execute the operation of the present invention, based on a mobile terminal and a user's voice registered through the image acquiring unit 160 and the voice recognition module 151. When a user's voice registered through the voice recognition module 151 is sensed, the image acquiring unit 160 can check a user's position by activating the camera. Then, the control unit 150 can operate the driving unit 110 such that the robot cleaner 100 is moved to the checked user's position, and can control the robot cleaner 100 to grasp a mobile terminal required to be charged, on a corresponding position. Alternatively, the control unit 150 can maintain a standby state.

Once the robot cleaner 100 is connected to a peripheral terminal device, the charging determination module 152 can check a remaining amount of a battery of the peripheral terminal device, and can determine whether the peripheral terminal device should be charged or not. The charging determination module 152 periodically checks a terminal device required to be charged, and provides a corresponding signal to the control unit 150. If it is determined that the terminal device is required to be charged, the control unit 150 can move the robot cleaner 100 to a position of the terminal device, or can output a feedback signal inducing a user to charge the terminal device.

After the robot cleaner has moved to the terminal device required to be charged, if a contacted state of the terminal device onto the charging unit 130 is not sensed for a preset time, the control unit 150 can control an operation (a task) which was being executed, to be executed continuously. For instance, the control unit 150 can control the driving unit 110 such that the robot cleaner 100 moves back to the cleaning region or the set region.

Referring to FIG. 4, the robot cleaner 100 can further include an input unit 170, a power unit 190, and a storage unit 195. A position search module 153 and a priority determination module 154 can be included in the control unit 150, or can be provided separately. The input unit 170 can include a microphone 171 for sensing a user's voice or peripheral noise. The input unit 170 can be configured to receive a control command for outputting at least one of information stored in the storage unit 195. The input unit 170 can include at least one button, e.g., an OK button and a setting button. The input unit 170 can be implemented as a hard key, a soft key, a touch pad, etc., and can be installed at an upper part of the robot cleaner 100. The input unit 170 can form a touch screen together with the output unit 140.

If a registered user's voice is sensed by the voice recognition module 152, the position search module 153 can search for a corresponding terminal. In this instance, if a corresponding terminal and a position of the corresponding terminal are not searched for a preset time, the control unit 150 can output a feedback voice through the audio output module 141.

The priority determination module 154 can determine charging priorities based on a preset reference, when a plurality of mobile terminals required to be charged are searched, or when the battery of the robot cleaner 100 is required to be charged. The preset reference can be set when the product is manufactured, or can be changed according to a user's input. More specifically, the priority determination module 154 can determine charging priorities according to whether a current time is a daytime or a nighttime, according to whether a prior charging command has been input or not, and based on a user's schedule information stored in the mobile terminal 200, a user's mobile terminal usage pattern, a distance between the robot cleaner 100 and the mobile terminal 200, a remaining amount of the battery of the mobile terminal 200, an activation pattern of the robot cleaner 100, a remaining amount of the battery of the robot cleaner 100, etc. Once the determined charging priorities are provided to the control unit 150, one of the robot cleaner 100 and the plurality of mobile terminals can be selectively charged according to the determined charging priorities. In this instance, the robot cleaner 100 and the plurality of mobile terminals can be simultaneously charged.

The power unit 190 includes a chargeable battery, and supplies power to the components of the robot cleaner 100. Once the mobile terminal 200 is positioned on the charging unit 130, the power unit 190 supplies power for charging the battery of the mobile terminal 200. The power unit 190 is provided with a battery sensor, and can provide a remaining amount of the battery and a charged state to the control unit 150. Then, the control unit 150 can output the sensed remaining amount of the battery and the sensed charged state, through the output unit 140. When the remaining amount of the battery of the power unit 190 is deficient, the control unit 150 can control the robot cleaner 100 to move to a charging station, such that the robot cleaner 100 is supplied with a charging current of the power unit 190.

The output unit 140 can include an audio output module 141 for outputting a sound or a voice, and an optical output module 142 for outputting an LED light. The audio output module 141 can output a feedback signal corresponding to a sensed signal or input information. For instance, the audio output module 141 can output a feedback signal sound or a voice message, when a terminal device required to be charged is sensed nearby, when there exists a user's voice command, when a contacted state of the mobile terminal 200 onto the charging unit 130 is sensed, when at least one event is generated from the mobile terminal 200 being charged, and when the mobile terminal 200 is completely charged.

As shown in FIG. 1, the optical output module 142 can be formed in a ring shape of a predetermined thickness, along an outer circumferential surface of the charging unit 130 disposed on an upper surface of the robot cleaner 100. The optical output module 142 can output light of a different pattern or a different color, according to an operation mode (e.g., a cleaning operation or a charging operation). The optical output module 142 can display a charged degree of the mobile terminal 200 being charged by the charging unit 130. A sliding preventing protrusion 132 having a stepped portion formed of a rubber material can be provided between the charging unit 130 and the optical output module 142, such that the mobile terminal 200 positioned on the charging unit 130 is prevented from falling off the charging unit 130.

The storage unit 195 stores therein a control program for controlling (driving) the robot cleaner 100, and data. The storage unit 195 can store therein information on a type of a mobile terminal chargeable by the charging unit 130, registration information, information on a product model, information on a charging method, and information on a registered user's voice (e.g., user information and voice information).

Figure 5A:
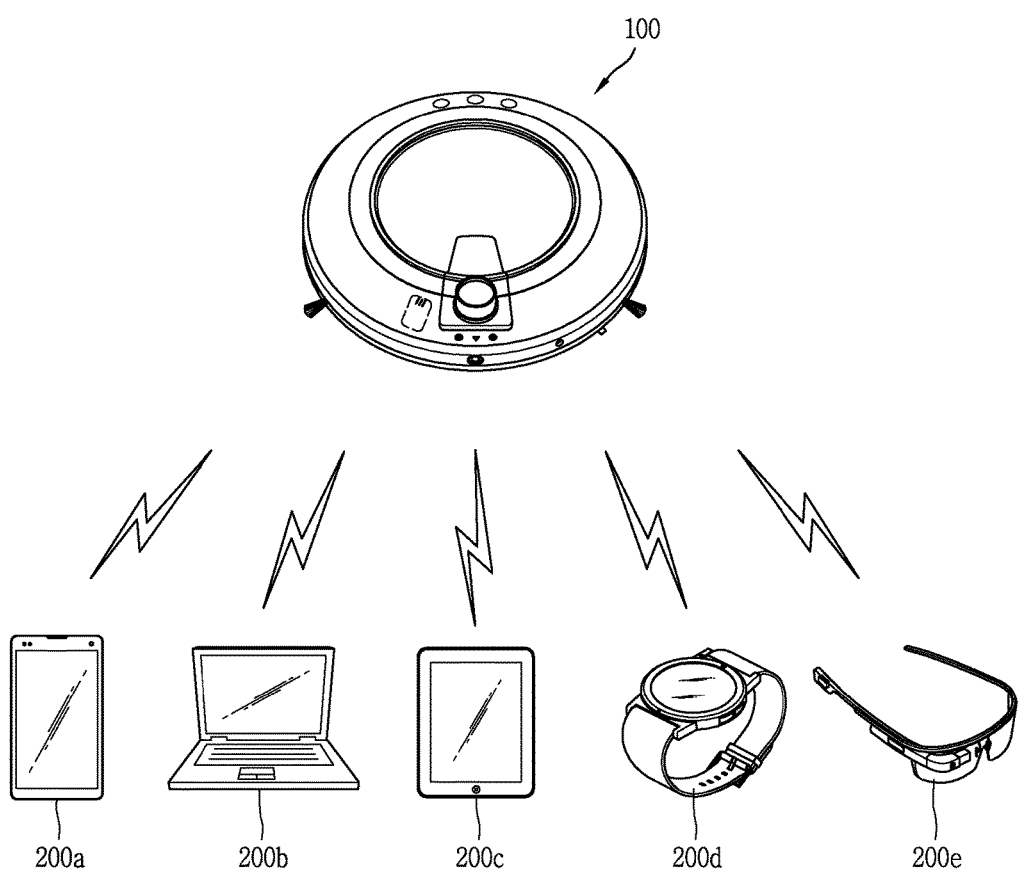
FIG. 5A is a view of a mobile terminal which communicates with a robot cleaner according to an embodiment of the present invention.
Figure 5B:
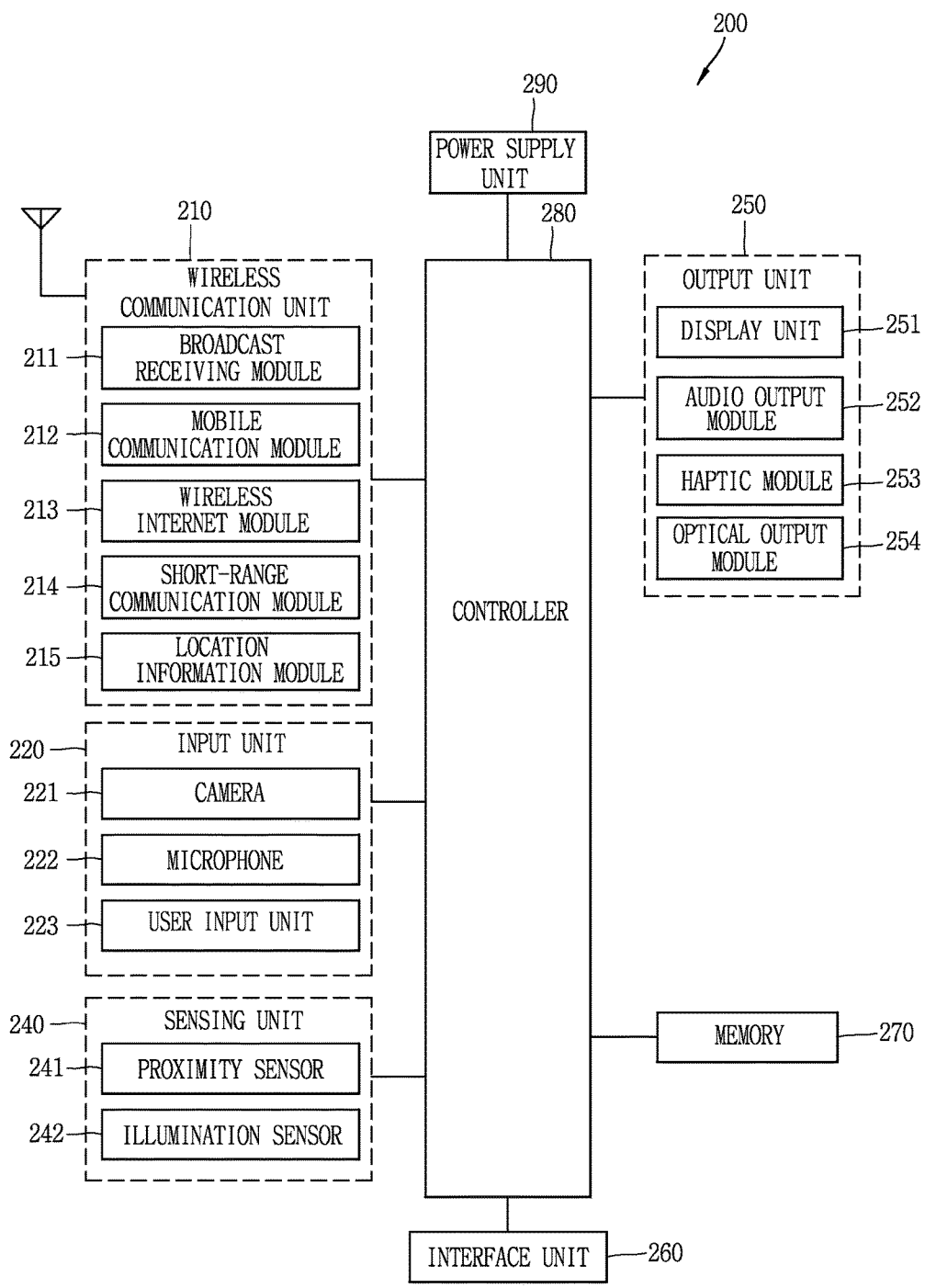
FIG. 5B is a block diagram illustrating the mobile terminal shown in FIG. 5A.

FIG. 5A is an exemplary view of a mobile terminal which communicates with a robot cleaner according to an embodiment of the present invention, and FIG. 5B is a block diagram illustrating a configuration of the mobile terminal shown in FIG. 5A.

As shown in FIG. 5A, the robot cleaner 100 according to an embodiment of the present invention can wirelessly communicate with at least one of mobile terminals (200a, 200b, 200c, 200d, 200e). The robot cleaner 100 can communicate with at least one mobile terminal, and determine whether the battery of the mobile terminal is required to be charged. When a user's entry is sensed through a door sensor, or when a user's voice is sensed through a microphone provided at the body of the robot cleaner 100, the robot cleaner 100 can attempt connection with a mobile terminal of the user. If the robot cleaner has failed in connection with the mobile terminal, or if a remaining amount of a battery of the mobile terminal is less than a reference value, the robot cleaner 100 can output a corresponding feedback through the audio output module 141, etc.

As another example, when the robot cleaner 100 is provided with an arm mechanism for grasping a mobile terminal, the robot cleaner 100 can wirelessly communicate with a mobile terminal so as to safely grasp the mobile terminal. More specifically, when a front surface of the mobile terminal is exposed to the outside, an up-down direction of a screen, an angle of the screen, and a direction of a charging terminal can be displayed on a display unit of a connected mobile terminal. The robot cleaner 100 can detect a wide area of the mobile terminal onto which the robot cleaner contacts for grasping, based on the displayed up-down direction of the screen, the angle of the screen, and the direction of the charging terminal.

As another example, when a rear surface of the mobile terminal is exposed to the outside, the robot cleaner 100 can analyze a form of the mobile terminal, by using light emitted from a light output unit or a flash disposed on the rear surface of the mobile terminal. Then, the robot cleaner 100 can detect a grasping region of the mobile terminal. Once the grasping region is detected, the robot cleaner 100 can move the mobile terminal in a state where the grasping region is perpendicular to a floor surface, and then can put down the mobile terminal on the charging unit 130.

The robot cleaner 100 can be configured to be connected to a corresponding mobile terminal at a time point when at least one of the mobile terminals (200a, 200b, 200c, 200d, 200e) contacts the charging unit 130 provided at the body. In this instance, the robot cleaner 100 can transmit, to the connected mobile terminal, state information of the robot cleaner 100 (e.g., battery information) and information indicating whether the robot cleaner 100 was executing a cleaning operation, as well as information indicating whether the mobile terminal has contacted the robot cleaner 100.

The robot cleaner 100 can further receive, from the connected mobile terminal, pre-stored schedule information or state information, as well as battery information. The state information can indicate whether the mobile terminal has been connected to another mobile terminal, whether there exists a task being executed, whether an event has occurred, etc. When the connected mobile terminal 200 is completely charged, the robot cleaner 100 can transmit a feedback signal to the mobile terminal, and other device connected to the mobile terminal (e.g., smart TV, other mobile terminal, etc.).

Mobile terminals presented herein can be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart glasses), head mounted displays (HMDs), and the like.

Referring to FIG. 5B, the mobile terminal 200 is shown having components such as a wireless communication unit 210, an input unit 220, a sensing unit 240, an output unit 250, an interface unit 260, a memory 270, a controller 280, and a power supply unit 290. Implementing all of the illustrated components of FIG. 5B is not a requirement, and that greater or fewer components can alternatively be implemented.

Referring now to FIG. 5B, the wireless communication unit 210 typically includes one or more modules which permit communications such as wireless communications between the mobile terminal 200 and a wireless communication system, communications between the mobile terminal 200 and another mobile terminal, communications between the mobile terminal 200 and an external server. Further, the wireless communication unit 210 typically includes one or more modules which connect the mobile terminal 200 to one or more networks.

To facilitate such communications, the wireless communication unit 210 includes one or more of a broadcast receiving module 211, a mobile communication module 212, a wireless Internet module 213, a short-range communication module 214, and a location information module 215. The input unit 220 includes a camera 221 for obtaining images or video, a microphone 222, which is one type of audio input device for inputting an audio signal, and a user input unit 223 (for example, a touch key, a push key, a mechanical key, a soft key, and the like) for allowing a user to input information. Data (for example, audio, video, image, and the like) is obtained by the input unit 220 and can be analyzed and processed by the controller 280 according to device parameters, user commands, and combinations thereof.

The sensing unit 240 is typically implemented using one or more sensors configured to sense internal information of the mobile terminal, the surrounding environment of the mobile terminal, user information, and the like. For example, in FIG. 5B, the sensing unit 240 is shown having a proximity sensor 241 and an illumination sensor 242. If desired, the sensing unit 240 can alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 221), a microphone 222, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few.

The sensing unit 240 can include sensors for sensing a contacted state of the body to the wireless charging pad. For instance, when occurrence of an induction current from the battery of the mobile terminal 200 is detected, the controller 280 can determine that the body of the mobile terminal 200 has contacted the wireless charging pad.

The output unit 250 is typically configured to output various types of information, such as audio, video, tactile output, and the like. The output unit 250 is shown having a display unit 251, an audio output module 252, a haptic module 253, and an optical output module 254. The display unit 251 can have an inter-layered structure or an integrated structure with a touch sensor in order to facilitate a touch screen. The touch screen can provide an output interface between the mobile terminal 200 and a user, as well as function as the user input unit 223 which provides an input interface between the mobile terminal 200 and the user.

In the present invention, the display unit 251 can display various types of information received from the robot cleaner 100, or various types of control commands input from a user. The display unit 251 can display an up-down direction of a screen, an angle of the screen, a direction of a connection terminal, etc. for facilitation of grasping by the robot cleaner 100.

The interface unit 260 serves as an interface with various types of external devices that can be coupled to the mobile terminal 200. The interface unit 260, for example, can include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 200 can perform assorted control functions associated with a connected external device, in response to the external device being connected to the interface unit 260.

The memory 270 is typically implemented to store data to support various functions or features of the mobile terminal 100. For instance, the memory 270 can be configured to store application programs executed in the mobile terminal 200, data or instructions for operations of the mobile terminal 200, and the like. Some of these application programs can be downloaded from an external server via wireless communication. Other application programs can be installed within the mobile terminal 200 at time of manufacturing or shipping, which is typically the case for basic functions of the mobile terminal 200 (for example, receiving a call, placing a call, receiving a message, sending a message, and the like). It is common for application programs to be stored in the memory 270, installed in the mobile terminal 200, and executed by the controller 280 to perform an operation (or function) for the mobile terminal 200.

The controller 280 typically functions to control overall operation of the mobile terminal 200, in addition to the operations associated with the application programs. The controller 280 can provide or process information or functions appropriate for a user by processing signals, data, information and the like, which are input or output by the various components depicted in FIG. 5B, or activating application programs stored in the memory 270. As one example, the controller 280 controls some or all of the components illustrated in FIG. 5B according to the execution of an application program that have been stored in the memory 270.

The power supply unit 290 can be configured to receive external power or provide internal power in order to supply appropriate power required for operating elements and components included in the mobile terminal 200. The power supply unit 290 can include a battery, and the battery can be configured to be embedded in the terminal body, or configured to be detachable from the terminal body.

When the mobile terminal 200 of the present invention is implemented as an induction type wireless charging mobile terminal, the battery of the mobile terminal 200 charges the mobile terminal 200 using an induction current transmitted from a second coil unit. Once a magnetic field generated from a first coil unit of the charging unit 130 of the robot cleaner 100 is induced by an electromagnetic induction phenomenon, the second coil unit generates an induction current by the induced magnetic field.

Figure 6:
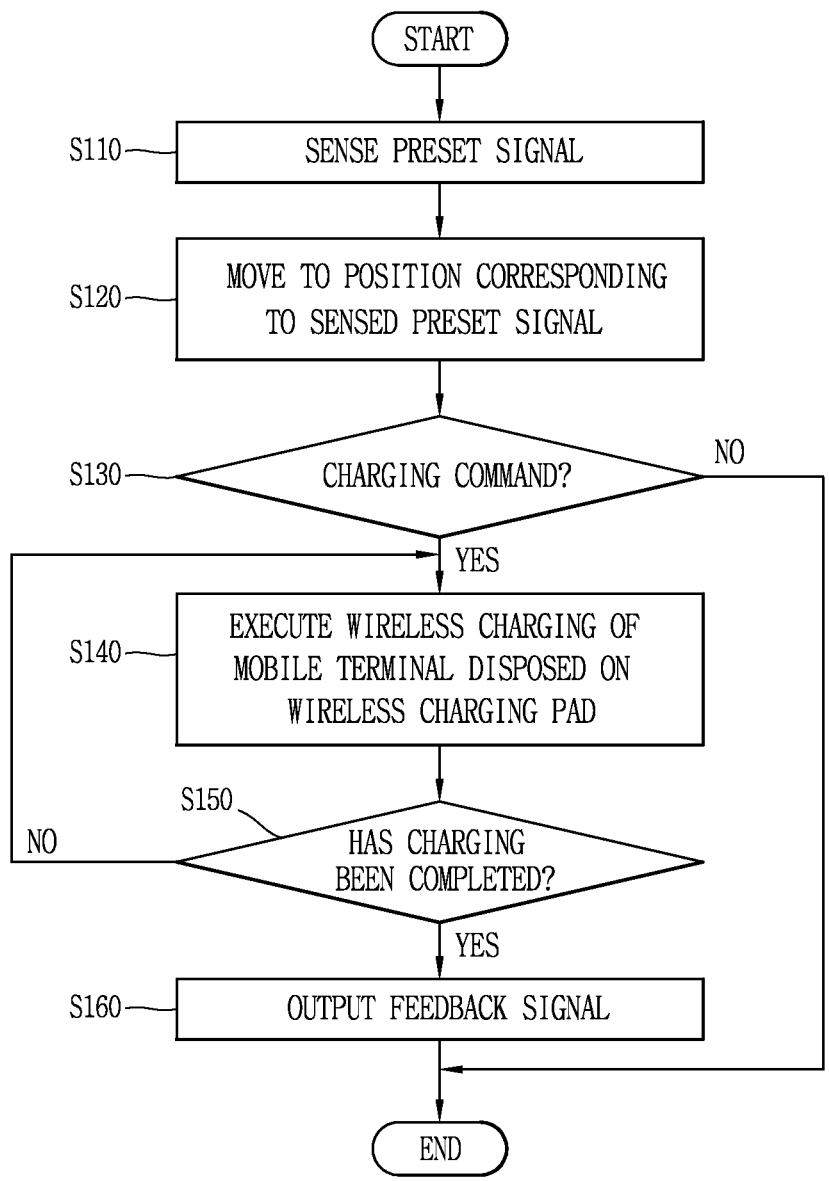

FIGS. 6 and 7 are flowcharts illustrating a method of charging a mobile terminal by a robot cleaner according to an embodiment of the present invention. Referring to FIG. 6, the robot cleaner 100 (refer to FIG. 1) senses a preset signal (S110). The preset signal can be either a voice command of a registered user for calling the robot cleaner, or a signal corresponding to a search result of a mobile terminal required to be charged. For this, once the registered mobile terminal 200 is searched within a predetermined region, the robot cleaner 100 attempts connection with the mobile terminal 200, and checks a remaining amount of its battery.

Once the preset signal is sensed, the robot cleaner 100 can move to a position corresponding to the sensed signal, by driving the driving unit 110 (refer to FIG. 1) provided at the body (S120). The control unit 150 of the robot cleaner 100 can check a remaining amount of the battery of the robot cleaner 100. Then, if the remaining amount of the battery is not large enough for the robot cleaner 100 to move to the position corresponding to the sensed signal, the control unit 150 can output a feedback signal. Then, the robot cleaner 100 can move to a charging station for charging the battery, etc.

Next, if a charging command is generated from the control unit 150 (S130), the robot cleaner 100 executes wireless charging of the mobile terminal 200 (refer to FIG. 5A) contacting a wireless charging pad of the charging unit 130 (refer to FIG. 1) (S140). The charging command can be generated by the control unit 150 when a positioned state of the mobile terminal 200 to the wireless charging pad is sensed, or when a voice indicating start of charging is input from a user.

Once the mobile terminal 200 is positioned on the wireless charging pad, the control unit 150 can calculate an expected charging completion time by checking a remaining amount of the battery of the mobile terminal 200. Then, the calculated expected charging completion time is output through the output unit 140.

While the mobile terminal 200 is charged by the charging unit 130, the control unit 150 can continuously execute a task which was being previously executed, or can execute a moving function by other call. For instance, if wireless charging of the mobile terminal 200 is started while the robot cleaner 100 cleans a cleaning region or a set region, the robot cleaner 100 can return to the cleaning region or the set region to execute a cleaning operation.

While the mobile terminal 200 is being charged by the charging unit 130, if at least one event is generated from the mobile terminal 200, the control unit 150 can output a signal indicating the occurrence of the event through the output unit 140. This will be explained in more detail with reference to FIG. 12. Once the mobile terminal disposed on the wireless charging pad is completely charged, the control unit 150 can output a feedback signal after recognizing the completely charged state (S160). The feedback signal can be output in the form of output of one of a voice, a sound, a message and light.

If the mobile terminal is completely charged to be called by a user or if a preset time lapses, the control unit 150 can drive the driving unit 110 (refer to FIG. 1) such that the charged mobile terminal 200 is disposed on the original position. For instance, when a user's voice 'bring me the mobile terminal 200 upon completion of charging' has been input, if the mobile terminal 200 is completely charged, the control unit 150 can control the robot cleaner 100 to move to a user's position. Then, the control unit 150 can control a voice feedback to be executed. For instance, a voice message indicating completion of the charging, such as 'Charging has been completed' can be output.

Referring to FIG. 7, before executing the step (S110) of sensing a preset signal, the robot cleaner 100 can execute its function, a cleaning function to suck dust or foreign materials on a cleaning region or a set region, according to a cleaning command of the control unit 150 (S710). In this instance, if a preset signal is sensed (S720), the robot cleaner 100 can stop the cleaning function (S730) (i.e., stop driving of the cleaning unit 120), and can move to a position corresponding to the sensed signal (S740).

After having moved to the position corresponding to the sensed signal, the control unit 150 maintains a standby state before the mobile terminal 200 contacts the charging unit 130. If a contacted state of the mobile terminal 200 onto the wireless charging pad of the charging unit 130 is not sensed within a preset time (e.g., several tens of seconds ~1 minute), or if the contacted state is released (S750), the control unit 150 releases the standby state, and operates the driving unit 110 such that the robot cleaner 100 moves to the aforementioned cleaning region or set region. In this instance, before the robot cleaner 100 moves to the aforementioned cleaning region or set region, the control unit 150 can output a voice message such as 'a cleaning process is to be resumed, if there is no device to be charged'. Then, the control unit 150 executes a cleaning function (S710).

If the contacted state of the mobile terminal 200 to the wireless charging pad of the charging unit 130 is sensed within a preset time (S750), the control unit 150 generates a charging command for wirelessly charging the mobile terminal disposed on the wireless charging pad (S760). Upon completion of the charging of the mobile terminal 200 (S770), the control unit 150 can output a feedback signal indicating the completion of the charging (S780), and can control the robot cleaner 100 to move to a predicted position by operating the driving unit 110 (S790). The predicted position can be changed according to a battery state of the robot cleaner 100, a user's position, and whether other mobile terminal required to be charged exists or not.

FIGS. 8 and 9 are flowcharts illustrating a method of recognizing a mobile terminal required to charge a battery, by the robot cleaner 100 with respect to the aforementioned step (S110). More specifically, FIG. 8 illustrates the robot cleaner 100 spontaneously recognizing a mobile terminal required to charge its battery, and FIG. 9 illustrates a case where the robot cleaner 100 recognizes a mobile terminal required to charge its battery by a user's call.

Referring to FIG. 8, the robot cleaner 100 attempts connection with a peripheral mobile terminal for wireless communication, through the communication unit 180 (S810). For this, the robot cleaner 100 can pre-register at least one mobile terminal 200 which can be wirelessly charged. More specifically, the control unit 150 can execute a registration mode for registering at least one mobile terminal 200 which can be wirelessly charged, based on a user's input.

Once the registration mode is executed, the control unit 150 can operate the camera of the image acquiring unit 160, and then can output a guidance voice such as 'Show me a device to be registered.' through the output unit 140. If a shape of the mobile terminal is recognized within a range of a view angle of the camera, the control unit 150 generates a capturing signal, and provides the capturing signal to the image acquiring unit 160. Then, the image acquiring unit 160 can acquire image information corresponding to the mobile terminal or a user of the mobile terminal. And the control unit 150 can register the mobile terminal by checking a model name, a shape, etc. of the product, based on the acquired image information.

The control unit 150 can recognize a user's voice input through the microphone 171, and can register the user's voice with the mobile terminal. In this instance, the control unit 150 can register user's information corresponding to the input user's voice. For instance, the control unit 150 can register a user's name.

Once both the mobile terminal and the user's voice are registered, the control unit 150 can control the registered mobile terminal to be wirelessly charged, if a charging command corresponding to the registered user's voice is input. In this instance, if the registered user's voice is sensed, the control unit 150 can execute a position search of the mobile terminal corresponding to the sensed user's voice. That is, even if a user's voice calling the robot cleaner 100 is not sensed, the control unit 150 can spontaneously execute a position search of the mobile terminal, and can check whether the user has the mobile terminal or not, a remaining amount of the battery of the mobile terminal, etc. If the registered terminal is not searched for a preset time, the robot cleaner 100 can execute a feedback. For instance, the robot cleaner 100 can output a voice message such as 'Don't you have any mobile terminal?'.

If the robot cleaner 100 is connected to a peripheral mobile terminal, the control unit 150 can check a remaining amount of a battery of the peripheral mobile terminal (S820), and can determine whether the battery is to be charged or not (S830). If it is determined that the battery should be charged, the robot cleaner 100 can move to a position of the peripheral mobile terminal by operating the driving unit 110 (S840). If the robot cleaner 100 is executing other task, e.g., a cleaning operation or a charging operation with respect to itself or other mobile terminal, the robot cleaner 100 can only output a voice feedback indicating that there is a mobile terminal required to be charged, without moving.

Upon recognition of the mobile terminal required to be charged, the robot cleaner 100 can move to a corresponding position, or can output a signal inducing charging of the recognized mobile terminal, at a current position (S850). The signal inducing charging of the recognized mobile terminal can be output in various manners, e.g., in the form of a voice message, an optical output, a preset signal sound, etc. When the signal inducing charging of the recognized mobile terminal is output, the control unit 150 can further output information on a remaining amount of a battery of the recognized mobile terminal. For instance, the control unit 150 can output information inducing charging, such as 'A remaining amount of the battery of the mobile terminal is 5%. The mobile terminal is required to be charged.' so that a user is informed of the remaining amount of the battery.

In response to the output of the signal inducing charging, if a contacted state of the mobile terminal onto the charging unit 130 provided on an upper surface of the robot cleaner 100 is sensed, the control unit 150 wirelessly charges the mobile terminal. If a contacted state of the mobile terminal to the charging unit 130 is not sensed for a preset time, the control unit 150 can output the signal inducing charging repeatedly at preset intervals, or can output the signal inducing charging with a higher intensity (e.g., increased volume, simultaneous output of a voice message and an LED).

Referring to FIG. 9, once a user's voice command calling the robot cleaner 100 is sensed (S910), the robot cleaner 100 can move to a position corresponding to the sensed user's voice command, by operating the driving unit 110 (S920). For this, the robot cleaner 100 includes a voice recognition module 151 for recognizing a user's voice input through the microphone 171. The control unit 150 can control the voice recognition module 151 to be in an activated state, even when the robot cleaner is in a standby state or is executing a cleaning operation.

If the robot cleaner 100 is executing another task (e.g., a cleaning operation, a charging operation with respect to its battery, etc.), the control unit 150 can stop the task and move to a position of a user who has called the robot cleaner. A voice command of the user who has called the robot cleaner 100 is not limited to a voice command related to charging of the battery of the mobile terminal. That is, the control unit 150 can firstly move to the user's position even if a user's voice command corresponds to a mere call, except for a special case (e.g., a remaining amount of the battery for movement is deficient).

Once the robot cleaner moves to the user's position by a call, the control unit 150 can sense a user's voice corresponding to a charging command (S930). For instance, if a user's voice such as 'Please charge my mobile terminal' is input, the control unit 150 can maintain a standby state until when a contacted state of the mobile terminal onto the charging unit 130 is sensed.

Even if a user's voice corresponding to a charging command is not sensed after the robot cleaner has moved to the user's position, the control unit 150 can attempt connection with the mobile terminal while moving to the user's position, thereby checking a remaining amount of the battery of the mobile terminal (S940). If it is determined that the battery of the mobile terminal is required to be charged (S950), the control unit 150 can output a voice message inducing charging.

Upon sensing of a contacted state of the mobile terminal 200 onto the charging unit 130, the control unit 150 can execute wireless charging of the mobile terminal 200 (S960). Once the mobile terminal 200 is positioned on the charging unit 130, the control unit 150 can calculate an expected charging completion time, and can output it through the output unit 140. For instance, a voice message such as 'Charging will be started. About 30 minutes are required until the charging is completed.' or 'Charging will be started. The charging is expected to be completed at 3:20.' can be output through a speaker, etc.

The control unit 150 can detect at least one schedule information, from the mobile terminal 200 positioned on the charging unit 130, the robot cleaner 100, or other electronic device connected to the robot cleaner 100. Then, the control unit 150 can provide information on an expected charging amount calculated based on the detected schedule information. For instance, if schedule information of 3 o'clock is detected from the mobile terminal 200 contacting the charging unit 130, the control unit 150 can provide a user with schedule information and a battery charging amount expected until the scheduled time. For instance, the control unit 150 can output a message, such as 'There is a schedule at 3 o'clock, and 30% of the battery will be charged by the time'.

Once the mobile terminal is positioned on the charging unit 130 and a user's voice designating a position (e.g., 'Bring the mobile terminal in front of a door after charging.') is input through the microphone 171, the control unit 150 can bring the mobile terminal to the designated position after a charging process. The charging unit 130 provided on an upper surface of the robot cleaner 100 can execute a wireless charging in various manners.

The wireless charging by the charging unit 130 can largely include an electromagnetic induction method using an electromagnetic induction phenomenon, and a magnetic resonance method for transmitting power to transmitting and receiving terminals with the same frequency. In the robot cleaner 100 of the present invention, the charging unit 130 which can execute the plurality of wireless charging types can be disposed on an upper surface of the body. For this, the charging unit 130 can be divided into a plurality of regions where different wireless charging types are executed. For instance, a first region of the wireless charging pad of the charging unit 130 is a region where a wireless charging by an electromagnetic induction method is executable, and a second region is a region where a wireless charging by a magnetic resonance method is executable. The first region and the second region can be partially overlapped with each other.

The electromagnetic induction method indicates technology to wirelessly transmit power by using a primary coil and a secondary coil, and mechanism power transmission occurring as a current is induced to another coil through a magnetic field changed at one coil by a magnetic induction phenomenon. The magnetic resonance method indicates power transmission from a wireless power transmission device to a wireless power reception device. More specifically, as the wireless power reception device is resonated by a wireless power signal received from the wireless power transmission device, power is transmitted to the wireless power reception device from the wireless power transmission device.

Efficiency of wireless power transmission by the electromagnetic induction method is less influenced by frequency characteristics, but is influenced by alignment and a distance between the wireless power transmission device (e.g., the charging unit 130) and the wireless power reception device (e.g., mobile terminal being charged) each including a coil. For wireless power transmission by the electromagnetic induction method, the wireless power transmission device 100 can include an interface surface having a flat surface. One or more wireless power reception devices can be disposed on the interface surface, and a transmission coil 1111a can be mounted below the interface surface. As a vertical space between the transmission coil 1111a and a reception coil 2911a of the wireless power reception device 200 disposed on the interface surface is formed to have a small area below the interface surface, a distance between the coils becomes small enough for wireless power transmission by an induction coupling method to be executed efficiently.

When executing a wireless charging by an electromagnetic induction method, a highest charging efficiency is obtained by positioning the mobile terminal 200 to the wireless charging pad of the charging pad 130 such that the primary coil provided at the wireless charging pad is concentric with the secondary coil provided at the battery of the mobile terminal 200. Especially, in case of an electromagnetic induction method, a position of the mobile terminal disposed on the wireless charging pad is very important. If the mobile terminal is not disposed on an optimum activation region of the wireless charging pad, or if the mobile terminal is positioned on the wireless charging pad with a separation distance more than a preset value, a charging efficiency is reduced and thus a lot of charging time and power loss are caused.

In order to generate resonance at the wireless power reception device (e.g., mobile terminal) by a magnetic resonance method, the mobile terminal can include a coil (or an antenna) to form a magnetic field having a specific resonance frequency. That is, a mobile terminal which is wirelessly charged by a magnetic resonance method can include a coil and a resonance circuit so as to be resonated by a magnetic field having a specific resonance frequency.

When executing a wireless charging by a magnetic resonance method, a magnetic field having a specific vibration frequency is formed at the wireless charging pad of the charging unit 130, by an alternating current power. Once resonance occurs by the magnetic field, power is generated in the mobile terminal 200 positioned on the wireless charging pad. When compared with an induction coupling method, efficiency of wireless power transmission by the magnetic resonance method is more influenced by frequency characteristics, but is less influenced by alignment and a distance between the wireless power transmission device (e.g., the charging unit 130) and the wireless power reception device (e.g., the mobile terminal 200) each including a coil.

Figure 10A:
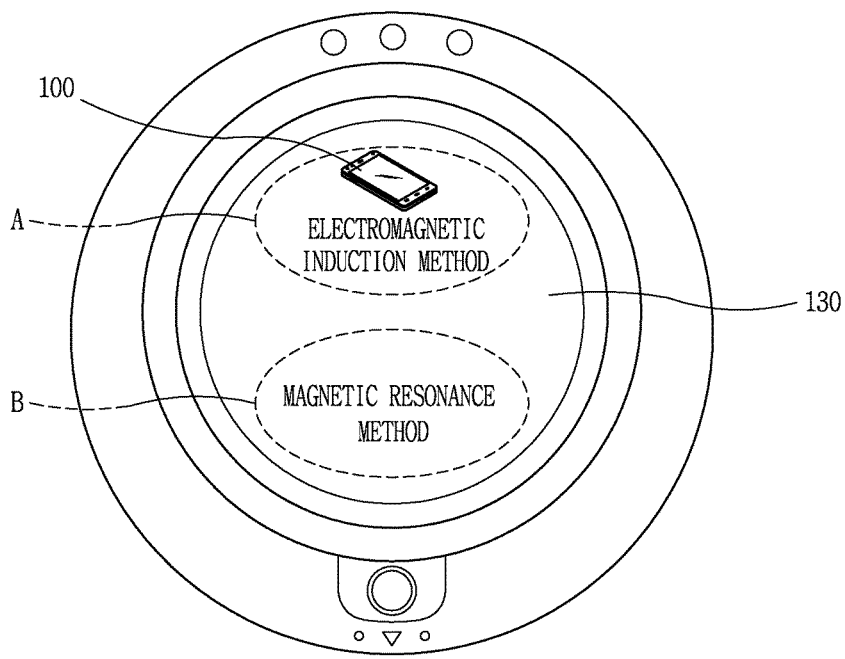

Referring to FIG. 10A, the wireless charging pad of the charging unit 130 can include a first region (A) where a wireless charging by an electromagnetic induction method is executable, and a second region (B) where a wireless charging by a magnetic resonance method is executable. The first region (A) and the second region (B) can be partially overlapped with each other. The control unit 150 can prestore a charging method of the mobile terminal 200 when registering the mobile terminal 200 in the aforementioned registration mode. Alternatively, when the robot cleaner 100 is connected to the mobile terminal 200 through the communication unit 180, or when a contacted state of the mobile terminal 200 onto the charging unit 130 is sensed, the control unit 150 can recognize a charging method of the mobile terminal.

FIG. 10A illustrates an example where the mobile terminal 200 which can be wirelessly charged by an electromagnetic induction method is disposed on a proper activation region (or activation range) (A). In this instance, the control unit 150 of the robot cleaner 100 can calculate and inform an expected charging completion time, and execute a charging command for wireless charging.

Figure 10B:
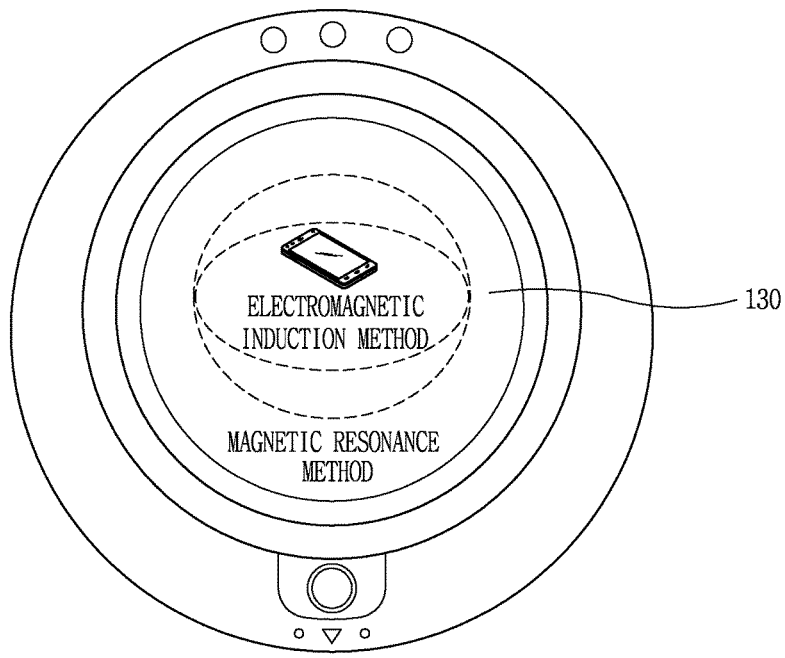

FIG. 10B illustrates an example where the mobile terminal 200 which can be wirelessly charged by an electromagnetic induction method is disposed on a region where different charging types are overlapped with each other. In this instance, even if the mobile terminal 200 can be wirelessly charged by a magnetic induction method, the control unit 150 can move the mobile terminal 200 to an upper side for an enhanced charging efficiency. For this, the control unit 150 can sense an activation region for a charging type corresponding to the position of the mobile terminal 200, and can calculate a charging efficiency on the current position.

For an enhanced charging efficiency, the control unit 150 can move the mobile terminal 200 disposed on the wireless charging pad up and down or right and left, using at least one sliding mechanism 131 of the charging unit 130. Alternatively, the control unit 150 can form a predetermined gradient of the body by folding or unfolding at least one folding mechanism 111 of the driving unit 110 of the robot cleaner 100, in a vertical direction. Then, the control unit 150 can adjust a position of the mobile terminal 200 disposed on the wireless charging pad, based on the formed gradient.

FIG. 10C illustrates an example where the mobile terminal 200 which can be wirelessly charged by an electromagnetic induction method is disposed on an improper activation region (B) where a wireless charging by a magnetic resonance method is executable. In this instance, the control unit 150 can compare a charging type of the mobile terminal 200 positioned on the charging unit 130, with a charging type executable at the region where the mobile terminal 200 is located, and can adjust a position of the mobile terminal 200 such that the mobile terminal 200 is positioned on an activation region corresponding to a proper charging type.

That is, the control unit 150 can move the mobile terminal 200 disposed on the wireless charging pad, to the proper activation region (A), by outputting a voice message inducing the mobile terminal 200 to be placed on a proper position, or by using the aforementioned sliding mechanism 131 or folding mechanism 111. For instance, as shown in FIG. 10C, the control unit 150 can move the mobile terminal 200 positioned on the region (B) to the region (A), by upward moving the sliding mechanism 131 of the charging unit 130. Once the mobile terminal 200 has moved to the proper region (A), the control unit 150 can calculate and inform an expected charging completion time, and can execute a wireless charging.

Figure 11:
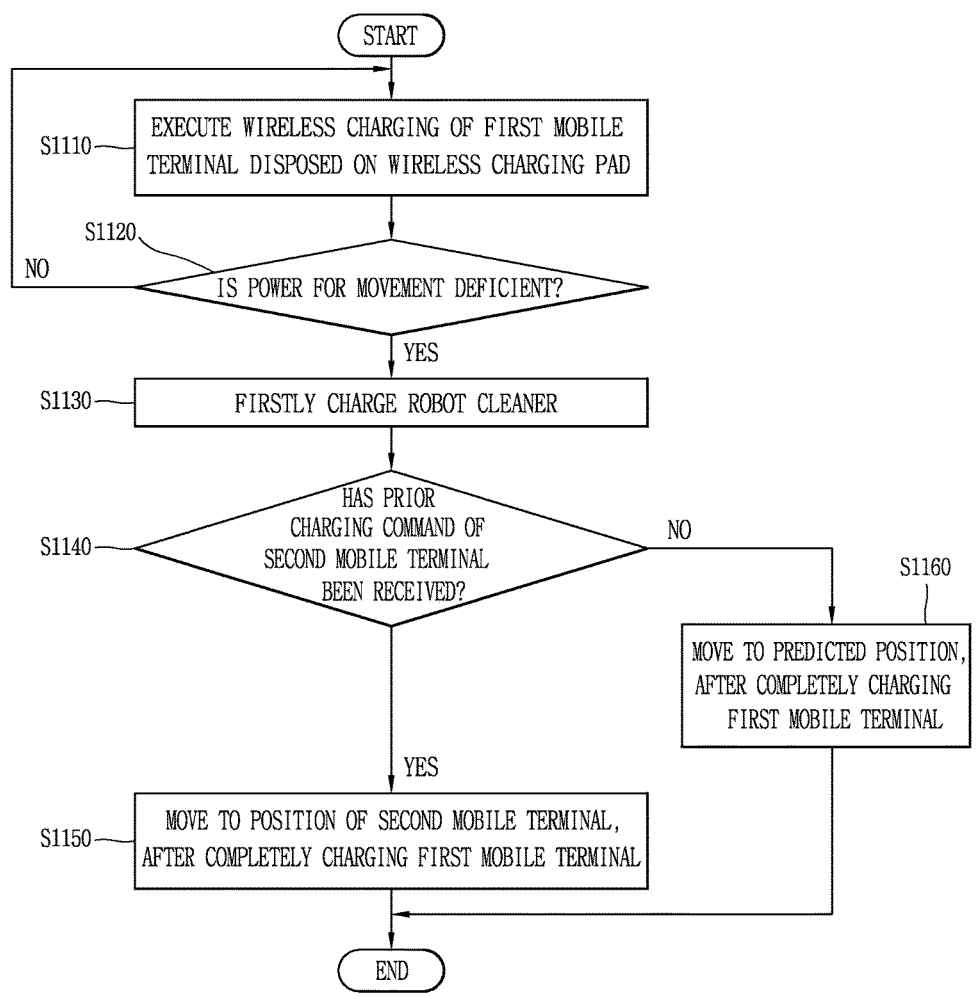
FIG. 11 is a flowchart illustrating a method of determining charging priorities of a plurality of devices required to charge a battery thereof, in a robot cleaner according to an embodiment of the present invention.

FIG. 11 is a flowchart illustrating a method of determining charging priorities among a plurality of devices required to be charged and the robot cleaner 100 according to an embodiment of the present invention. Once the mobile terminal 200 is positioned on the charging unit 130 of the robot cleaner 100, the control unit 150 executes a wireless charging of the mobile terminal 200 (S1110).

When another task (e.g., cleaning operation) was being executed before the mobile terminal 200 is positioned, if it is determined that a remaining amount of the battery of the robot cleaner is not large enough to perform the cleaning operation and the wireless charging of the mobile terminal 200, the control unit 150 can stop the other task to firstly execute the wireless charging of the mobile terminal 200.

If it is determined that power of the robot cleaner 100 for movement is deficient as a remaining amount of the battery of the robot cleaner 100 is decreased to a value less than a reference value (S1120), the control unit 150 can stop the wireless charging of the mobile terminal 200, and can firstly execute a wireless charging of the battery of the robot cleaner 100 (S1130).

For this, the control unit 150 can determine charging priorities of the robot cleaner 100 and at least one mobile terminal, based on a preset reference by the priority determination module 154. Then, the control unit 150 can selectively charge one of the plurality of devices according to the determined charging priorities, or can alternately charge the plurality of devices.

The charging priorities based on the preset reference can be determined according to whether a current time is a daytime or a nighttime, according to whether a prior charging command has been input or not, and based on a user's schedule information, a user's mobile terminal usage pattern, a remaining amount of the battery of the mobile terminal, an activation pattern of the robot cleaner, a remaining amount of the battery of the robot cleaner, etc.

For instance, when a user must immediately leave, such that the mobile terminal is likely to be used soon according to its usage pattern, when a user has applied a prior charging command, and when a remaining amount of the battery of the mobile terminal is very small or the battery is discharged, the mobile terminal can be firstly wirelessly charged. Further, when a remaining amount of the battery of the robot cleaner is too small to be used to move the robot cleaner, or during a nighttime when the mobile terminal is not used, the mobile terminal can be firstly wirelessly charged as an exception.

As aforementioned, if a remaining amount of the battery of the robot cleaner 100 is not large enough to charge the battery of the mobile terminal 200, or if power of the robot cleaner 100 for movement is deficient, the control unit 150 can firstly charge the battery of the robot cleaner 100 than the battery of the mobile terminal 200, by changing the charging priorities.

If it is determined that the power of the robot cleaner 100 for movement is deficient, the control unit 150 can move to a charging station for charging the battery of the robot cleaner. Then, the control unit 150 can control its battery and the battery of the mobile terminal 200 to be charged simultaneously.

More specifically, the control unit 150 can check a remaining amount of the battery of the robot cleaner 100 at preset periods. And if the remaining amount is more than a reference value, the control unit 150 continuously executes predetermined operations (i.e., a charging operation with respect to the battery of the mobile terminal 200, and a cleaning operation). Further, if the remaining amount is decreased to a value less than the reference value, the control unit 150 transmits a charging request signal to the charging station, by using a high frequency signal (RF) or a microwave (MW), so as to charge the battery of the robot cleaner 100. The charging station having received a magnetic field signal receives the charging request signal from the robot cleaner 100, and then generates a magnetic field through an AC magnetic field antenna, thereby informing its position. Once the position of the charging station is checked, the control unit 150 can move to the position of the charging station by driving the driving unit 110, thereby simultaneously charging the battery of the robot cleaner 100 and the battery of the mobile terminal 200 positioned on the charging unit 130.

If a prior charging command of a second mobile terminal is received while the mobile terminal 200 is being charged (S1140), the control unit 150 can stop the charging of the mobile terminal 200, and can move to a position of the second mobile terminal by driving the driving unit 110 (S1150). In this instance, if a remaining amount of the battery of the robot cleaner 100 is too small to be used to move the robot cleaner 100 to the position of the second mobile terminal, the control unit 150 can charge the battery of the body of the robot cleaner 100 with a value more than a reference value. Then, the control unit 150 can control the robot cleaner 100 to move to the position of the second mobile terminal.

Further, if the charging of the mobile terminal 200 is completed in a state where the prior charging command of the second mobile terminal has been received or has not been received, the control unit 150 moves to a predicted position to put down the mobile terminal 200 (S1160). In the former case, the control unit 150 can move to a position of the second mobile terminal to put down the mobile terminal 200. In the latter case, the control unit 150 can move to a position set by a user, or the original position of the mobile terminal 200 to put down the mobile terminal 200.

In addition, if a plurality of mobile terminals required to be charged are detected before at least one mobile terminal is positioned on the charging unit 130, the control unit 150 can determine charging priorities of the plurality of mobile terminals based on preset conditions.

More specifically, the control unit 150 can determine charging priorities with consideration of a distance between a current position of the robot cleaner 100 and the mobile terminal, a user's pattern in using the mobile terminal (e.g., a user's average time to wake-up, a user's average time to go out, etc.), a remaining amount of the battery of the mobile terminal, an expected charging completion time, a moving path of the robot cleaner 100, etc. Then, the control unit 150 can sequentially charge the plurality of mobile terminals according to the determined charging priorities.

Figure 12:
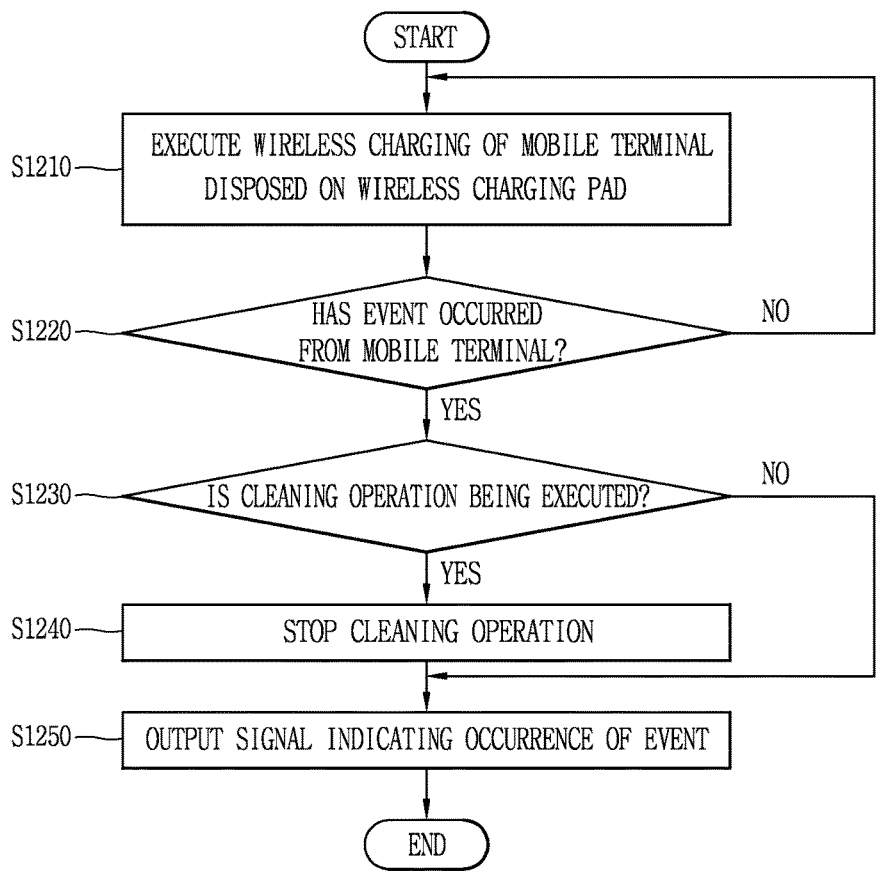
FIG. 12 is a flowchart illustrating a method of processing an event generated from a mobile terminal being charged, in a robot cleaner according to an embodiment of the present invention.

FIG. 12 is a flowchart illustrating a method of processing an event generated from the mobile terminal 200 being charged, by the robot cleaner 100 according to an embodiment of the present invention. Upon detection of a contacted state of the mobile terminal 200 onto the wireless charging pad of the charging pad 130, the control unit 150 calculates an expected charging completion time, and starts to charge the mobile terminal 200 (S1210). If at least one event is generated from the mobile terminal 200 while the mobile terminal 200 is being charged, the control unit 150 checks a current state of the robot cleaner 100. If the robot cleaner 100 is executing a cleaning operation (S1230), the control unit 150 can stop the cleaning operation or can convert a current mode into a noise reducing mode (S1240). The event can be reception of a call, reception of a message, output of an alarm, etc.

Then, the control unit 150 can output a signal indicating the occurrence of the event from the mobile terminal 200 being charged, through the output unit 140 (S1250). For instance, the control unit 150 can control the optical output module 142 of the robot cleaner 100, such that an LED light corresponding to the generated event is output. The optical output module 142 can output an LED light of a different color according to a type of the event generated from the mobile terminal 200. For instance, if a message has been received, the optical output module 142 can output an LED light of a yellow color. Further, if a call has been received, the optical output module 142 can output an LED light of a red color.

If an event requiring a user's response such as a call reception occurs, the control unit 150 can check a user's position by activating a voice recognition function, and can move to the user's position by driving the driving unit 110. Then, the control unit 150 can inform the call reception. The control unit 150 can output a voice message corresponding to the event, e.g., 'A call has been received', or 'A message has been received.') through the audio output module 141. Alternatively, the control unit 150 can inform the occurrence of the event to the outside by moving the robot cleaner 100 with a preset pattern (e.g., by rotating the robot cleaner 100 on its own position).

The control unit 150 can provide information on the occurred event according to a setting. For instance, if a message has been received from the mobile terminal 200 being charged, the control unit 150 can extract a recipient and content of the received message. Then, the control unit 150 can convert the content into a voice, and then can output the content through the audio output module 141. If the mobile terminal 200 positioned on the charging unit 130 is completely charged, the control unit 150 can output a feedback signal indicating the completion of the charging, and can put down the charged mobile terminal 200 on an expected position.

Figure 13:
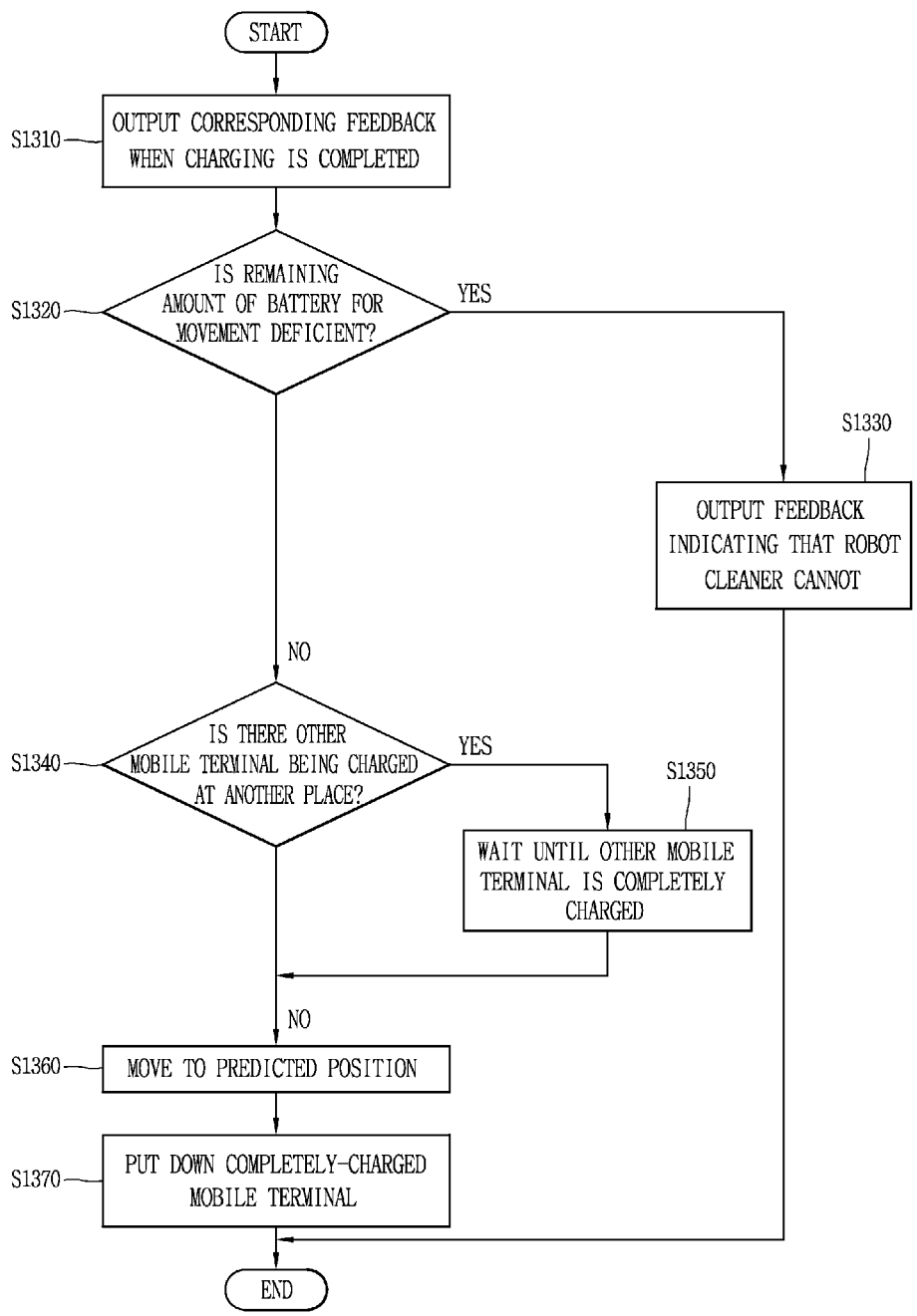
FIG. 13 is a flowchart illustrating a method of transmitting a mobile terminal charged completely, in a robot cleaner according to an embodiment of the present invention.

FIG. 13 is a flowchart illustrating a method of transmitting the mobile terminal 200 charged completely, by the robot cleaner 100 according to an embodiment of the present invention. Upon completion of charging of the mobile terminal 200 positioned on the charging unit 130, the control unit 150 can output a feedback signal indicating the completion of the charging (S1310). The feedback signal can be at least one of a preset signal sound, a voice message, an LED light and an operation with a preset pattern.

Upon completion of wireless charging of the mobile terminal 200 positioned on the charging unit 130, the control unit 150 can move to the original position of the robot cleaner 100 when the mobile terminal 200 has been positioned on the charging unit 130. For instance, when the robot cleaner 100 has grasped the mobile terminal 200 in front of a door, or when the mobile terminal 200 has contacted the charging unit 130, the robot cleaner 100 can place the charged mobile terminal in front of the door.

If a remaining amount of the battery of the robot cleaner 100 is not large enough to move the robot cleaner 100 (S1320), the control unit 150 can output a signal indicating that the robot cleaner 100 cannot move. For instance, the control unit 150 can output a voice message such as 'Charging has been completed. The robot cleaner cannot move due to deficiency of its battery.' (S1330).

If the remaining amount of the battery of the robot cleaner 100 is large, the control unit 150 checks whether there exists another mobile terminal being charged at another place (S1340). If there exists another mobile terminal being charged, the control unit 150 maintains a standby state until the another mobile terminal is completely charged (S1350). However, if there is not another mobile terminal being charged, or if the another mobile terminal is completely charged, the control unit 150 can control the robot cleaner 100 to move to an expected position by driving the driving unit 110. Then, the control unit 150 can put down the charged mobile terminal on a floor, etc. That is, the control unit 150 can separate the mobile terminal 200 positioned on the charging unit 130, by using the sliding mechanism 131 of the charging unit 130 or the folding mechanism 111 of the driving unit 110.

After the robot cleaner 100 moves to the original position of the robot cleaner 100 when the mobile terminal has been positioned on the charging unit 130, if a user's motion corresponding to the completely charged mobile terminal is sensed, the control unit 150 can inform the charged state by moving the robot cleaner 100 along the sensed user's motion, by driving the driving unit. In this instance, the control unit 150 can check the user's motion through a user's voice sensed by the camera of the image acquiring unit 160 and the voice recognition module 151.

In embodiments of the present invention, the charging unit 130 can be divided into a plurality of charging regions such that a plurality of mobile terminals are simultaneously charged. The charging unit 130 can be provided with at least one storage region. After the robot cleaner 100 grasps a plurality of mobile terminals at one time and puts down the mobile terminals on the wireless charging pad, if the mobile terminals are completely charged on the wireless charging pad, other mobile terminal disposed on the storage region can be separated from the wireless charging pad.

The robot cleaner of the present invention includes the following advantages. Firstly, a user can charge a battery of a mobile terminal required to be charged by calling the robot cleaner, without directly taking the mobile terminal to a connection terminal or a wireless charging device.

Secondly, the robot cleaner can spontaneously search and recognize a mobile terminal required to be charged, and can induce a user to charge the mobile terminal by approaching the user. This enhances a user's convenience. Thirdly, the robot cleaner can execute its own function while a mobile terminal is being charged, and can take the charged mobile terminal to a user's desired position.

As the present features can be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims. Further, the components such as the control unit 150, controller 280, etc. include sufficient hardware to execute the described algorithms (e.g., flowcharts) to perform the described functions. For example, the control unit and controllers include hardware-embedded processors executing the described algorithms to perform the described functions. Similar comments apply to other components.

What is claimed is:
1. A robot cleaner, comprising:
a driving unit having a wheel motor for driving one or more wheels installed at a lower part of the robot cleaner and configured to move the robot cleaner;
a charging unit having a wireless charging pad for wirelessly charging a mobile terminal and a sensor for sensing whether the mobile terminal is positioned on the wireless charging pad, and configured to wirelessly charge the mobile terminal;

a cleaning unit having a suction motor for sucking air and a dust collecting mechanism, and configured to suck dust or foreign materials on a cleaning region or a set region; and a controller configured to:

control the driving unit to move the robot cleaner to a position of the mobile terminal corresponding to a sensed preset signal, and in response to sensing a contacted state of the mobile terminal on the wireless charging pad, control the robot cleaner to execute the wireless charging of the mobile terminal placed on the wireless charging pad according to a charging command, wherein when the contacted state of the mobile terminal on the wireless charging pad is not sensed for a preset time or the contacted state of the mobile terminal is released after the robot cleaner has moved to the position of the mobile terminal, the controller controls the driving unit to move the robot cleaner back from the position of the mobile terminal to the cleaning region to execute a cleaning operation, and wherein the controller is further configured to:

output information indicating an expected charging amount, based on schedule information from the mobile terminal or the robot cleaner and an expected charging completion time.

2. The robot cleaner of claim 1, wherein the controller is further configured to:

stop driving the cleaning unit when the preset signal is sensed, control the driving unit to move the robot cleaner to the position of the mobile terminal, and output a feedback signal when the wireless charging of the mobile terminal is completed.

3. The robot cleaner of claim 1, wherein the controller is further configured to activate a mode for voice recognition, and wherein when a user's voice signal calling the robot cleaner is sensed, the controller controls the driving unit to move the robot cleaner to a position of the user corresponding to the voice signal.

4. The robot cleaner of claim 3, further comprising:

a camera configured to capture an image of the mobile terminal or a facial region of a user using the mobile terminal, wherein the controller is further configured to:

register the mobile terminal by using the recognized user's voice and the captured image, and execute the wireless charging of the registered mobile terminal according to a charging command from the user.

5. The robot cleaner of claim 4, wherein the controller is further configured to:

search a position of the registered mobile terminal when the voice of the user is sensed, and output a feedback voice if the registered mobile terminal is not searched for a preset time.

6. The robot cleaner of claim 1, further comprising:

a communication processor configured to execute a wireless communication with the mobile terminal, wherein the controller is further configured to:

determine whether the mobile terminal needs to be charged, by checking a remaining amount of a battery of the mobile terminal, through the wireless communication, and output information indicating the mobile terminal needs to be charged based on the determination by the controller.

7. The robot cleaner of claim 6, wherein the controller is further configured to control the driving unit to move the robot cleaner to the position of the mobile terminal, based on the determination by the controller.

8. The robot cleaner of claim 1, wherein the charging unit is divided into a plurality of regions where different wireless charging types are executable, and wherein when the mobile terminal is placed on the charging unit, the controller is further configured to compare a charging type of the mobile terminal with a charging type corresponding to the position of the mobile terminal, and adjust the position of the mobile terminal so the mobile terminal is positioned on a region corresponding to the charging type thereof.

9. The robot cleaner of claim 8, wherein the controller is further configured to adjust the position of the mobile terminal so the mobile terminal placed on the charging unit moves to another region, by using a sliding mechanism provided at a lower part of the charging unit, or a folding mechanism provided at a lower part of the robot cleaner.

10. The robot cleaner of claim 1, wherein the controller is further configured to:

determine charging priorities of the robot cleaner and the mobile terminal, based on a preset reference, and selectively charge one of the robot cleaner and the mobile terminal according to the determined charging priorities.

11. The robot cleaner of claim 1, wherein the controller is further configured to output a signal indicating an occurrence of an event on the mobile terminal.

12. The robot cleaner of claim 11, wherein the controller is further configured to output light using an optical output unit to indicate the occurrence of the event.

13. The robot cleaner of claim 1, wherein the controller is further configured to control the driving unit to move the robot cleaner to a corresponding position of a time point when the mobile terminal was positioned on the wireless charging pad, when the wireless charging of the mobile terminal is completed.

14. The robot cleaner of claim 13, wherein when a user's motion is sensed after the robot cleaner has moved to the corresponding position of a time point when the mobile terminal was positioned on the wireless charging pad according to the completion of the wireless charging of the mobile terminal, the controller is further configured to output a signal indicating the completion of the charging of the mobile terminal, while the robot cleaner moves along the sensed user's motion.

15. The robot cleaner of claim 14, wherein when the robot cleaner has moved to the corresponding position of a time point when the mobile terminal was positioned on the wireless charging pad according to the completion of the wireless charging of the mobile terminal, the controller is further configured to separate the mobile terminal placed on the wireless charging pad, by using a sliding mechanism provided at a lower part of the charging unit, or a folding mechanism provided at a lower part of the robot cleaner.

16. The robot cleaner of claim 1, further comprising:

stop driving the cleaning unit of the robot cleaner when the preset signal is sensed;

moving the robot cleaner to the position of the mobile terminal; and outputting a feedback signal when the wireless charging of the mobile terminal is completed.

17. A method of controlling a robot cleaner including a driving unit having a wheel motor for driving one or more wheels installed at a lower part of the robot cleaner and configured to move the robot cleaner; a charging unit having a wireless charging pad for wirelessly charging a mobile terminal; and a sensor for sensing whether the mobile terminal is positioned on the wireless charging pad, and configured to wirelessly charge the mobile terminal; and a cleaning unit having a suction motor for sucking air and a dust collecting mechanism, and configured to suck dust or foreign materials on a cleaning region or a set region; and a controller, the method comprising:

moving, via the controller controlling the driving unit, the robot cleaner to a position of the mobile terminal corresponding to a sensed preset signal;

sensing, via the sensor, that the mobile terminal is contacted on the wireless charging pad of the charging unit of the robot cleaner; and executing, via the controller controlling the charging unit, the wireless charging of the mobile terminal positioned on the wireless charging pad, wherein when the contacted state of the mobile terminal on the wireless charging pad is not sensed for a preset time or the contacted state of the mobile terminal is released after the robot cleaner has moved to the position of the mobile terminal, moving, via the controller controlling the driving unit, the robot cleaner back from the position of the mobile terminal to the cleaning region to execute the cleaning operation, and wherein the method further comprises:

outputting information indicating an expected charging amount, based on schedule information from the mobile terminal or the robot cleaner and an expected charging completion time.

\* \* \* \* \*